United States Patent
Popovic et al.

(10) Patent No.: US 9,879,767 B2
(45) Date of Patent: Jan. 30, 2018

(54) ACTUATION SYSTEMS AND METHODS

(71) Applicant: Worcester Polytechnic Institute, Worcester, MA (US)

(72) Inventors: Marko B. Popovic, Cambridge, MA (US); Christopher J. Berthelette, Uxbridge, MA (US); Matthew Dipinto, Hubbardston, MA (US); James D. Sareault, Walpole, MA (US); Thane R. Hunt, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 14/903,126

(22) PCT Filed: Jul. 10, 2014

(86) PCT No.: PCT/US2014/046232
§ 371 (c)(1),
(2) Date: Jan. 6, 2016

(87) PCT Pub. No.: WO2015/006612
PCT Pub. Date: Jan. 15, 2015

(65) Prior Publication Data
US 2016/0138690 A1    May 19, 2016

Related U.S. Application Data

(60) Provisional application No. 61/844,604, filed on Jul. 10, 2013.

(51) Int. Cl.
*F16H 33/02*     (2006.01)
*F03G 1/02*      (2006.01)
*F03G 3/08*      (2006.01)

(52) U.S. Cl.
CPC ............... *F16H 33/02* (2013.01); *F03G 1/02* (2013.01); *F03G 3/08* (2013.01)

(58) Field of Classification Search
CPC ............... F03G 1/00; F03G 1/08; F16H 33/02
See application file for complete search history.

(56) References Cited

U.S. PATENT DOCUMENTS

| | | | | |
|---|---|---|---|---|
| 2,493,989 A | * | 1/1950 | Middlestetter | F03G 1/00 185/37 |
| 3,945,453 A | * | 3/1976 | Black | B60K 6/10 180/54.2 |

(Continued)

FOREIGN PATENT DOCUMENTS

| EP | 0410730 A2 * | 1/1991 | ......... G03G 15/0126 |
|---|---|---|---|
| WO | 2009/039568 | 4/2009 | |

OTHER PUBLICATIONS

Berthelette, C. et al., "Rotary One-To-Many (OTM) Novel Actuator", Project Report, Apr. 25, 2013 (Abstract; pp. 1, 8, 9; project scope; paragraph 2; series module configuration; Figures 1, 2).

(Continued)

*Primary Examiner* — Phillip A Johnson
(74) *Attorney, Agent, or Firm* — Greenberg Traurig, LLP; Roman Fayerberg

(57) ABSTRACT

Actuation systems and methods are disclosed. Such systems may comprise a motor having a drive shaft, one or more modules coupled to the drive shaft, each module comprising one or more energy storage elements and one or more actuating members connecting the one or more energy storage elements to one or more degrees of freedom, which are configured to actuate in response to a discharge of energy from the one or more energy storage element, and a plurality of clutches associated with each module to couple the energy storage element of the module to the drive shaft of the motor (Continued)

and to control an energy state of the energy storage element independent of energy storage elements of other modules.

17 Claims, 24 Drawing Sheets

(56) References Cited

U.S. PATENT DOCUMENTS

2008/0036127 A1* 2/2008 Yang .................. F03G 1/08
267/182
2008/0305386 A1 12/2008 Havel et al.

OTHER PUBLICATIONS

Cheng, Nadia, Genya Ishigami, Stephan Hawthorne, Hao Chen, Malik Hansen, Maria Telleria, Robert Playter, and Karl Iagnemma. "Design and analysis of a soft mobile robot composed of multiple thermally activated joints driven by a single actuator." In Robotics and Automation (ICRA), 2010 IEEE International Conference on, pp. 5207-5212. IEEE, 2010.

Hunt, T. et al., "Linear One-To-Many (OTM) system Many degrees of freedom independently actuated by one electric motor", 5th Annual IEEE International Conference on Technologies for Practical Robot Application, Greater Boston Area, Massachusetts, USA, Apr. 22-23, 2013 (Abstract; Figures 2, 5).

International Search Report for corresponding PCT Application No. PCT/US14/46232, dated Nov. 12, 2014.

Li Shiqi Yang Liu, and Ming Xie. "Implementation of a single motor driven manipulator with multiple joints." Industrial Robot: An International Journal 38, No. 1 (2011): 48-57.

Liu Yang, Shiqi Li, and Ming Xie. "Design and implementation of a new single-motor driven arm manipulator." In Mechatronics and Automation, 2007. ICMA 2007. International Conference on, pp. 3071-3076. IEEE, 2007.

* cited by examiner

ACTUATION SYSTEMS AND METHODS

RELATED APPLICATIONS

This application is a national phase filing under 35 U.S.C. 371 of International Application No. PCT/US2014/046232, filed Jul. 10, 2014, which claims the benefit of and priority to U.S. Provisional Application No. 61/844,604, filed on Jul. 10, 2013, which applications are incorporated herein by reference in their entireties.

BACKGROUND

1. Field

The present disclosure relates to One-to-Many systems for use in actuator applications, and more particular in robotic applications.

2. Background

Systems requiring multiple degrees of freedom typically require dedicated motors per degree of freedom, pneumatics, or hydraulics. These systems are a very effective method of distributing power throughout a system; however, they can often turn out to be inefficient, heavy, and costly. For portable systems, these methods are often inappropriate.

Therefore, there is a need for a more energy-dense system would be more effective.

SUMMARY

In some aspects, there is provided an actuation system comprising a motor having a drive shaft; one or more modules coupled to the drive shaft, each module comprising one or more energy storage elements and one or more actuating members connecting the one or more energy storage elements to one or more degrees of freedom, which are configured to actuate in response to a discharge of energy from the one or more energy storage element; and a plurality of clutches associated with each module to couple the energy storage element of the module to the drive shaft of the motor and to control an energy state of the energy storage element independent of energy storage elements of other modules.

In some aspects, there is provided an actuation system comprising a motor having to at least one drive shaft; two or more energy storage elements operatively connected to one or more degree of freedom to actuate the one or more degree of freedom; and a plurality of clutches configured to couple the two or more energy storage elements to the at least one drive shaft of the motor and to control an energy state of the two or more energy storage elements, wherein the one or more degree of freedom for each energy storage element is actuated in response to a discharge of energy from each energy storage element. In some embodiments, an amount of total stored energy over a period of time for the two or more energy storage elements has a discharge rate or a total power output that is greater than a maximum generated power input of the motor for the same period of time.

In some aspects, there is provided a method of actuation of one or more of degrees of freedom that includes providing a motor with at least one drive shaft; operatively connecting one or more energy storage elements to one or more degree of freedom; enabling the motor to transfer energy to the one or more energy storage elements; storing the transferred energy by the one or more energy storage elements; and allowing the one or more energy elements to release the stored energy to actuate the one or more degree of freedom. In some embodiments, the method may further include the steps of configuring a plurality of clutches to couple the one or more energy storage elements to the at least one drive shaft of the motor and to control an energy state of the one or more energy storage elements, and operating the plurality of clutches to perform one or more of the transferring, storing, and allowing steps.

DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

Figure 1:
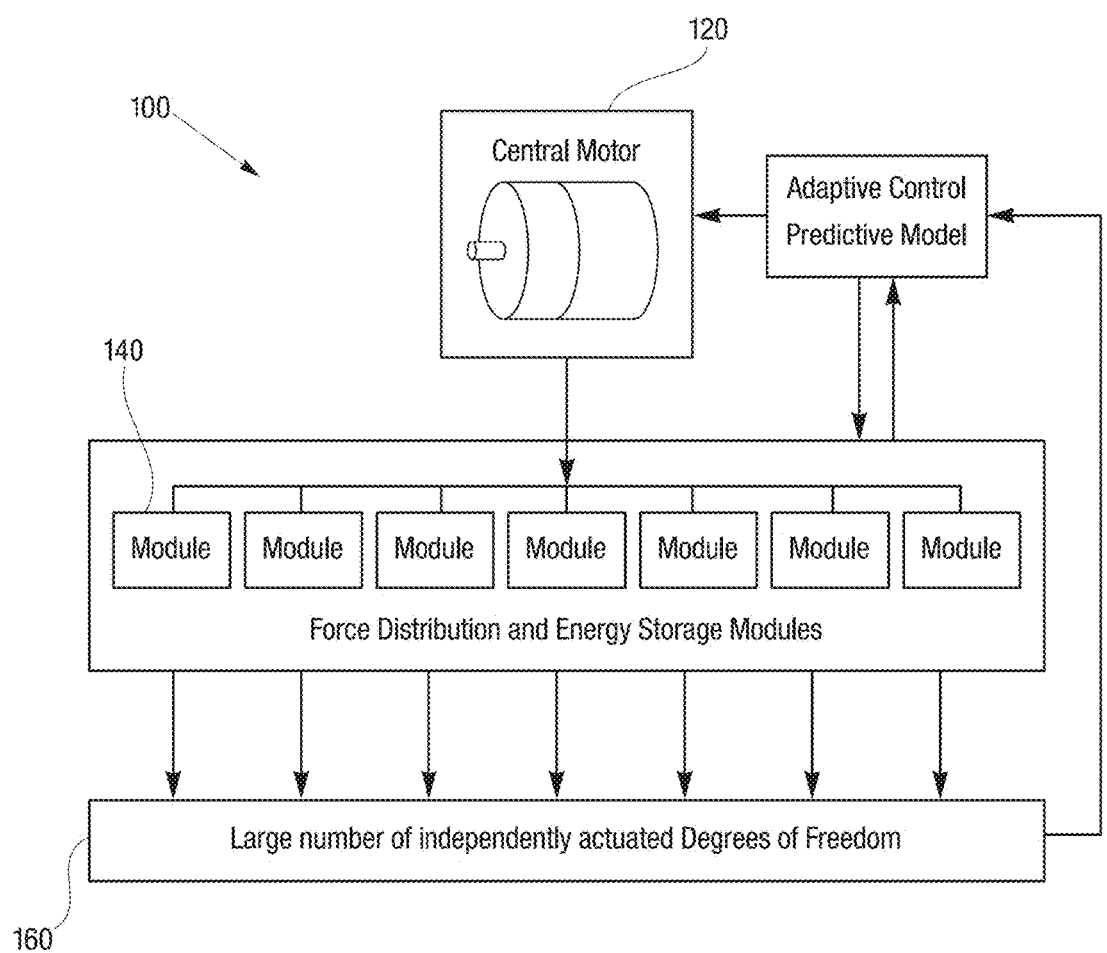
FIG. 1 illustrates an example of a one-to-many system architecture.

While the above-identified drawings set forth presently disclosed embodiments, other embodiments are also contemplated, as noted in the discussion. The drawings shown are not necessarily to scale, with emphasis instead generally being placed upon illustrating the principles of the presently disclosed embodiments. Numerous other modifications and embodiments can be devised by those skilled in the art which fall within the scope and spirit of the principles of the presently disclosed embodiments.

DETAILED DESCRIPTION

The present disclosure provides OTM systems for use in robotic applications.

It is contemplated the One-to-Many (OTM) system can provide actuation of multiple degrees of freedom from a single electrical motor, independently of one another. The OTM system can take a single electric motor as input and, as an output, actuates multiple degrees of freedom independently of one another through the connection of modules, with each module representing a single degree of freedom. In some embodiments, the OTM system can include one or more modules disposed along a drive shaft of an electric motor and coupled to the drive shaft via a plurality of clutches that enable the modules to charge, discharge and release energy independently of one another. In some embodiments, each module includes an energy storage element that is charged by the motor and an actuating element driven by the discharge of energy from the energy storage element. The discharge of energy from the energy storage element activates the actuating member, which in turn actuates the degree of freedom connected to the actuating member.

In some embodiments, the energy storage elements are connected to degrees of freedom in one-to-one correspondence. It is also contemplated that multiple energy storage elements can be operatively connected to one degree of freedom to actuate the degree of freedom. In some embodiments, a single energy storage element may be connected to multiple degrees of freedom. For example, there could be multiple energy storage elements charged or loaded with potential energy by a single motor, where each energy storage element of the multiple storage elements may be released or discharged at the same time to actuate the degree of freedom. There are many possible configurations/applications as to how the multiple storage elements may release or discharge to actuate the degree of freedom. Further, it is contemplated that the system could incorporate two or more energy storage elements with varied and/or different energy storage capacities. Further, it is possible the varied capacity energy storage elements can be used to achieve a conditioned, planned or patterned function to one or more actuating member.

It is possible that the stored energy in the energy storage elements could be any one of potential energy, kinetic energy, gravitational energy, chemical energy, radiant energy, thermal energy and sound energy.

The OTM systems can allow the motor power to be amplified. In the OTM systems, it is possible the load is not directly connected to the electric motor. Instead, energy storage elements can be filled with potential energy by the motor, which is then passively stored until the energy is needed at the point of actuation, Accordingly, power output at each degree of freedom is not limited by the maximum output power of the motor itself and can be amplified.

Moreover, because in the OTM systems, the load is not directly connected to the electric motor, the motor is isolated from the actuating member, so that a change in force by a motor does not affect the actuating member, while the motor is protected from sudden increases in force on the actuating member.

FIG. 1 illustrates an OTM system 100 architecture, according to some embodiments. The OTM system 100 discloses a single electric motor 120 as an input and output independently actuated degrees of freedom through the connection of one or more modules 140, with each module representing a single degree of freedom to be output or actuated degree of freedom 160. The OTM system 100 concept is the idea that a single motor can be used to convert electrical energy stored in batteries or other energy driving the motor to energy, such as elastic potential energy, which can be quickly released on command, in one or more degrees of freedom. Using actuations methods such as hydraulic or pneumatic systems become prohibitively heavy when scaled to many degrees of freedom; electromechanical systems, however, have a much greater energy density, making it more suitable in a biologically inspired design. For an N degrees of freedom OTM system, there are N truly independent actuation points $f1(x1), f2(x2), \ldots, fN(xN)$. Hence, in terms of independence, each mechanical degree of freedom of an OTM system is actuated as it would be if actuated by an independent actuator. The OTM systems can allow for a build-up of energy over time that can be then released over a shorter period of time, thus providing for much larger power output to a load than the motor's generated power input.

Figure 2:
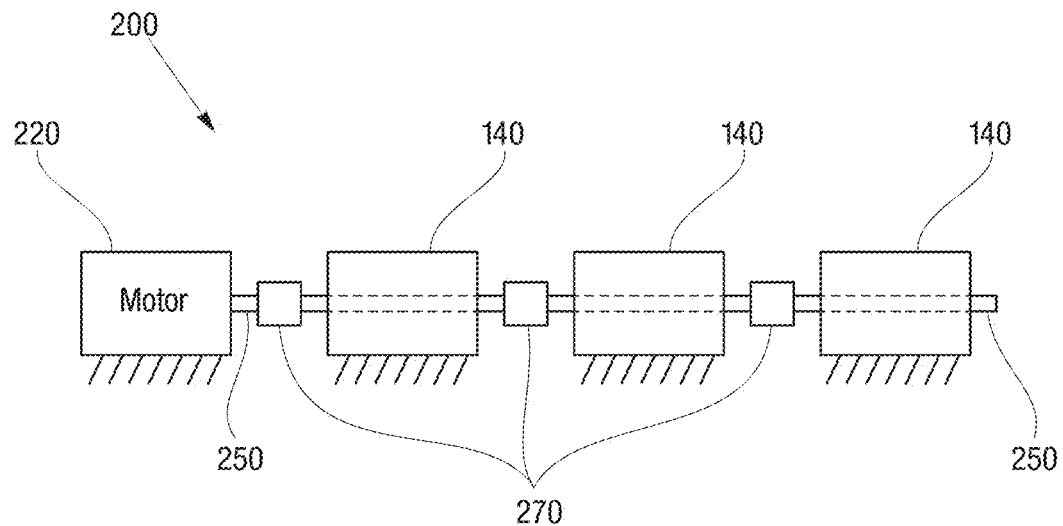
FIG. 2 illustrates an embodiment of an OTM system, including a plurality of modules independently coupled to a drive shaft of an electric motor, according to some embodiments.

Referring to FIG. 2, illustrates a linear module configuration or series module configuration of the OTM system 200 having a plurality of modules 240 independently coupled to a drive shaft 250 of an electric motor 220. In particular, the plurality of modules 240 are disposed along a drive shaft 250 of an electric motor 220 and coupled to the drive shaft 250 via a plurality of clutches 270 (or couplings) that enable the modules 240 to charge, discharge and release energy independently of one another.

Still referring to FIG. 2, the plurality of modules 240 are connected in one-to-one correspondence to a plurality of degrees of freedom (not shown) arranged in a linear module configuration or series module configuration, as noted above. Each module 240 may comprise an energy storage element and an actuating element connected to a degree of freedom. While, in some embodiments, there is one to one correspondence between energy storage elements and degrees of freedom. However, the correspondence between energy storage elements and degrees of freedom may not be one to one. For example, in some embodiments, multiple energy storage elements may operatively be connected to a single degree of freedom, or vice versa. The actuating member is actuated due to the discharge of energy from the energy storage element, which causes the actuating member to move the degree of freedom. The energy storage device would take the energy from the motor 220 and store it locally within the individual module 240. This energy could then be released on demand, allowing for multiple degrees of freedom to actuate simultaneously. The energy could be stored in any form, although the compliance provided by storing it in elastic potential energy has some advantages to some embodiments.

Still referring to FIG. 2, the modules 240 may be coupled to a single drive shaft 250 of an electric motor 220 by a plurality of clutches 270, which are configured to control an energy state of energy storage elements independently of one another. That is, the clutches 270 are configured to enable energy storage elements in each module 240 to charge, discharge, and release energy independently of one another. In this manner, individual degrees of freedom connected to the energy storage elements by the actuating members can also be actuated independently of one another. Because the actuating members are not connected to the drive shaft 250 of the motor 220, but are instead driven by the discharge of energy from the corresponding energy storage elements, power output at each degree of freedom is not limited by the maximum output power of the motor 220 itself and can be amplified. Moreover, because of some of the embodiments in the OTM systems, the load is not directly connected to the motor (or electric motor) 220, the motor 220 is isolated from the actuating member, so that a change in force by a motor 220 does not affect the actuating member, while the motor 220 is protected from sudden increases in force on the actuating member.

Still referring to FIG. 2, in some embodiments of the OTM systems the given external conditions, i.e. external forces or loads, have a degree of freedom that may be biased toward an initial position. For example, when there is no force on the degree of freedom from the actuating member; the degree of freedom will remain in the initial position. The degree of freedom may be moved from the initial position by the actuating element due to a discharge of energy from the energy. However, when the energy storage element is reset, the actuating member will no longer exert force on the degree of freedom, thus allowing the biased degree of freedom to return to its original position, thereby resetting the actuating member. In some embodiments, all movements of the degree of freedom may be controlled by actuating members.

Still referring to FIG. 2, different applications for the OTM systems according to some embodiments may be very dissimilar, but because the OTM systems are modular, the OTM systems are very flexible as they allow for any number of modules, as well as connection of modules in parallel and in series, and hence can be utilized for a wide range of applications. In some embodiments, the OTM systems can be shared across multiple devices by using a customizable connector system to the points of desired actuation.

Still referring to FIG. 2, a variety of clutches can be used with the OTM systems according to some embodiments to allow for the energy storage element to connect and disconnect to the drive shaft as desired and to release energy in a controlled manner.

Figure 3A:
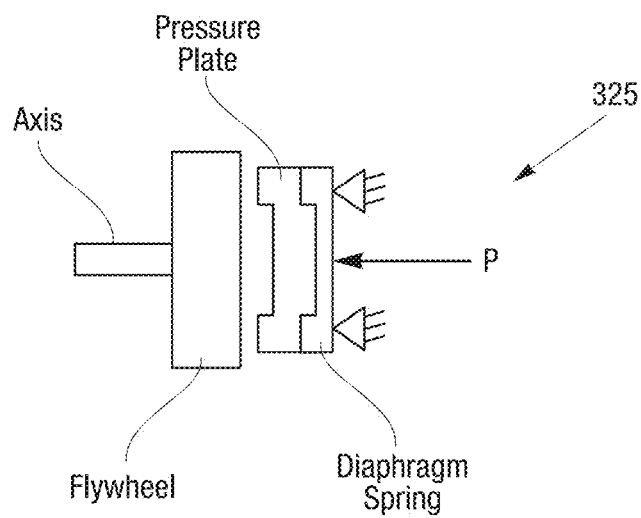
FIGS. 3A-C illustrate embodiments of friction clutches suitable for use with an OTM system, according to some embodiments.
Figure 3B:
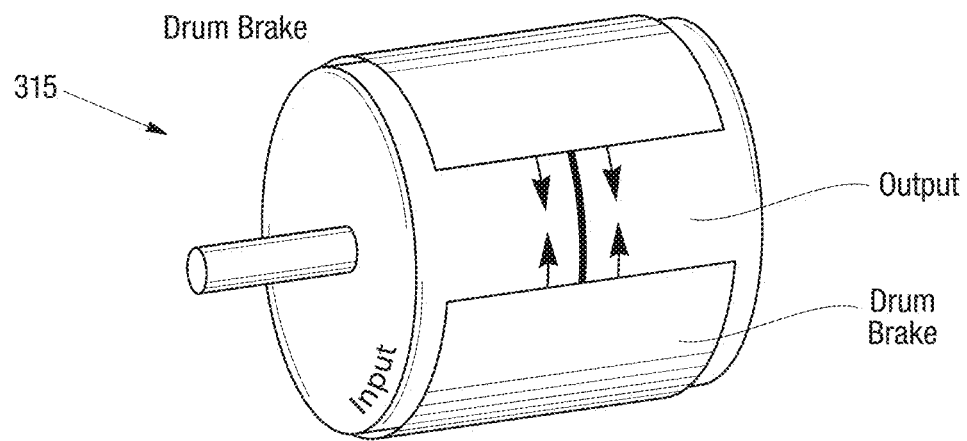
Figure 3C:
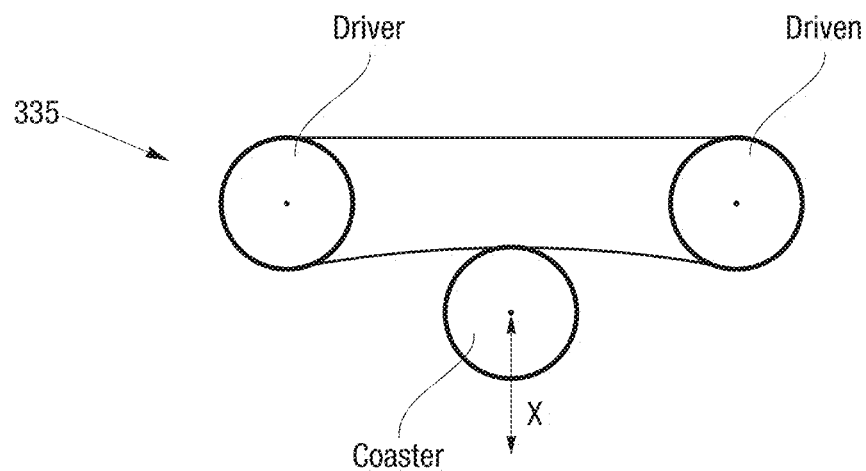

FIGS. 3A-C illustrate embodiments of friction clutches suitable for use with an OTM system, the OTM system can include friction clutches which are a common type of energy transfer in a clutch system. These systems rely on contact between two surfaces that will rotate together creating a friction force between them that causes the shafts to start or stop rotation, depending on the application. Friction clutches can dissipate large amounts of energy and allow for possible slip between the contact surfaces if the normal force is not great enough to maintain static friction. Some common types of friction clutches include disc clutches 315 and drum clutches 325. According to some embodiments friction clutches could be implemented in the OTM system in several different forms. For example, a disc clutch 315 or a drum clutch 325 could be used to engage the two rotating shafts together. Further, a moving pulley 335 could act as a tensioner for two parallel shafts that are connected by a belt. Still further, a roller (not shown) could move in and out to create contact between two coaxial shafts.

Figure 4:
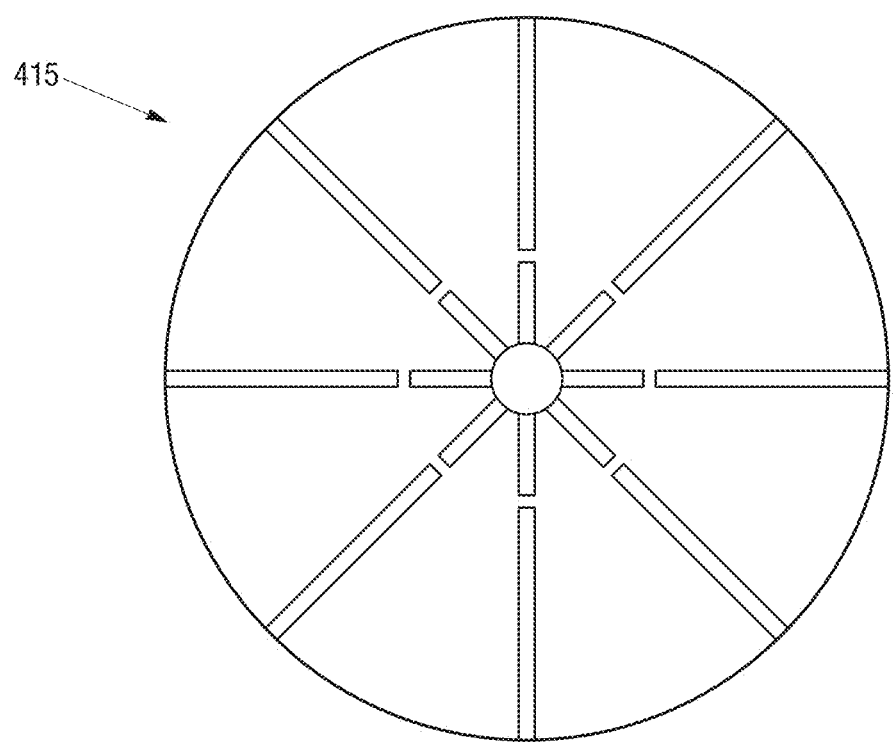
FIG. 4 illustrates an embodiment of a fluid coupling clutch suitable for use with an OTM system, according to some embodiments.

Referring to FIG. 4, according to embodiments of the OTM system, the OTM system can include fluid coupling clutches 415 that operate on a similar principle as friction clutches, except there is no direct contact between the rotating surfaces; instead, fluid coupling clutches depend on friction between a fluid that separates two surfaces and the surfaces themselves. The rotation of one shaft produces movement of a fluid, which in turn makes the other shaft rotate. Typically, the fluid will be incompressible and will be enclosed and the surfaces will have an optimized fan shape. This allows for a more efficient system than could be achieved otherwise. Because the two elements are separated by a fluid medium and do not have direct contact with each other, there is a delay between when the first element begins rotating and the second element begins rotating. This allows for smooth transitions when the clutch is engaged or disengaged. It also decreases the overall efficiency of the clutch system, and energy is constantly lost due to friction between the fluid and the containing volume, which dissipates out of the system as heat.

Still referring to FIG. 4, there can be at least two ways of implementing a fluid coupling clutch 415. The first method involves pumping fluid into the enclosure with the fan shape to allow for the clutch to engage, and draining the enclosure when it is time to disengage. This allows the fluid flow to only move the fan when engagement is desired. Other methods could involve using a fluid that can change viscosities on demand. An electrorheological fluid with a very low viscosity might not be able to spin the fan and connect the shafts at all, but when it is excited its viscosity increases by several orders of magnitude, allowing shafts to couple and energy to be transferred.

Still referring to FIG. 4, instead of relying on a force to create friction, a positive contact clutch relies on a force creating a physical interference between the geometry of two shafts. This is usually achieved by moving one shaft into position so that its teeth push the corresponding teeth on the opposite shaft. Positive contact clutches can provide rotation without slip between the clutch elements, but they have to be engaged at low speeds. The implementation of a positive contact would be similar to that of a friction clutch. Each of the friction clutch mechanisms described above could be executed as a positive contact clutch by using gears instead of friction plates.

Figure 5:
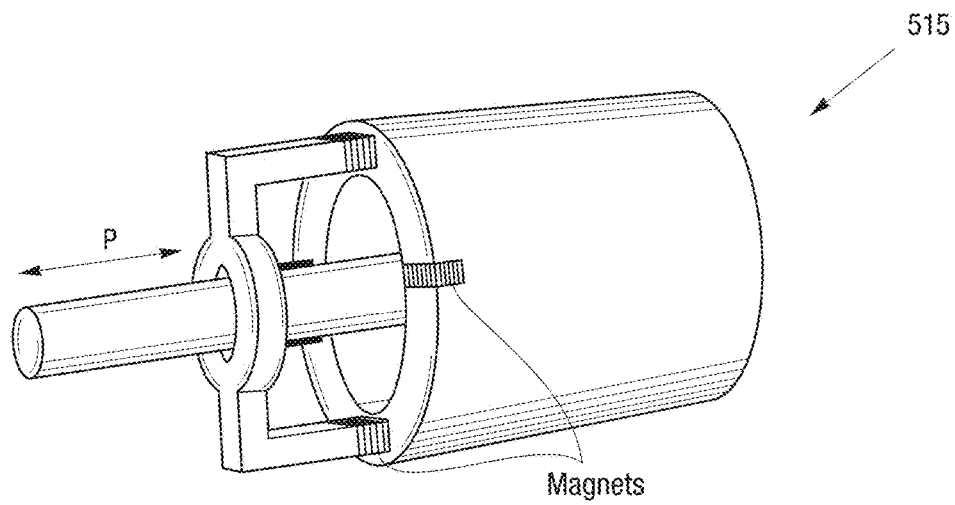
FIG. 5 illustrates an embodiment of a magnetic clutch suitable for use with an OTM system, according to some embodiments.

Referring to FIG. 5, according to embodiments of the OTM system, the OTM system can include magnetic clutches 515 that use principles of electromagnetism to engage and disengage the clutch elements. They can be used to power a standard friction clutch, or they can exert magnetic forces on the shafts without any physical contact being necessary. These clutches typically have smooth engagements and disengagements, and are very common due to their easy control mechanisms. To use a magnetic clutch in the system, one shaft would have permanent magnets and the other shaft would have electromagnets at a corresponding location. The electromagnets would polarize when engagement is required and depolarize when it is not. Further, it is possible that the magnets can be placed together with a linear slide. Wherein, the torque limit can equal the shear limit of the magnetic force so the result can be minimal wear.

Still referring to FIG. 5, according to embodiments of the OTM system, the OTM system can include overrunning clutches are clutch mechanisms that allow rotation in only one direction by creating interference between parts of the clutch when one element tries to rotate in the wrong direction. When a force tries to rotate a clutch element opposite the clutch's direction of flow, a mechanical interference prevents the rotation. This type of clutch is commonly seen on devices such as a ratchet pawl. An overrunning clutch would be very useful in the selected configuration. Such a clutch would be able to prevent back-driving of the charged elastic element until it is time to release the stored energy.

Figure 6:
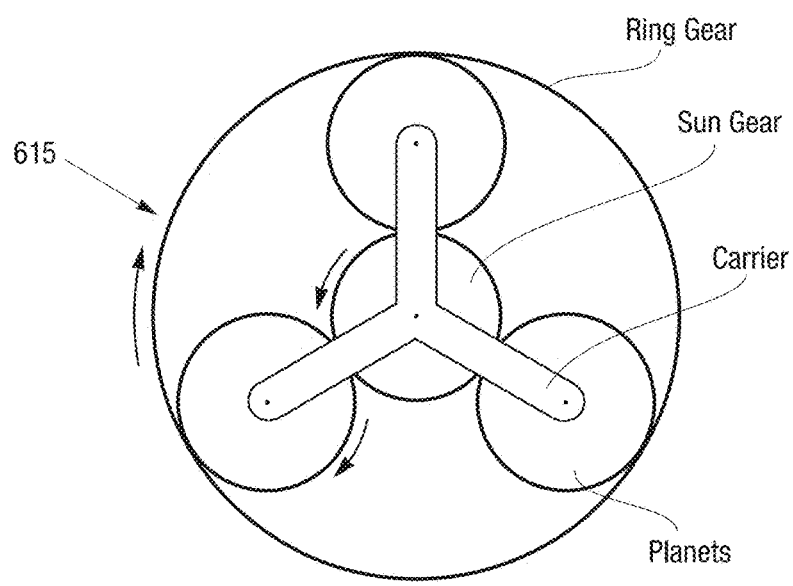
FIG. 6 illustrates an embodiment of a planetary gearing clutch suitable for use with an OTM system, according to some embodiments.

Referring to FIG. 6, according to embodiments of the OTM system, the OTM system can include a planetary gear set 615 with a fixed location for the sun gear (such as on a rotating shaft) is a two degree of freedom system. Spinning a given gear won't provide a corresponding output for the rest of the system unless there is another element whose position is defined. By locking the position of one of the bodies, one degree of freedom is removed from the system and the rotation of one body will lead to the rotation of another. This concept allows the system to be used as a clutch. By attaching one of the rotating shafts to the sun gear and attaching the other shaft to the carrier of the planet gears, the rotation of the shafts become coupled together. When the outer ring becomes locked to the ground, the two shafts can now rotate together. The process of actually grounding the outer ring can be accomplished by nearly any type of brake.

It should of course be understood that other types of clutches or combinations of various clutches can be used in connection with the OTM systems according to some embodiments. Moreover, other mechanisms that enable coupling and uncoupling of different elements of the OTM systems of the present disclosure (i.e. motor, energy storage elements, actuating members etc) can be used. For example, it is possible that instead of using clutches, that friction based brakes could be used.

Figure 7:
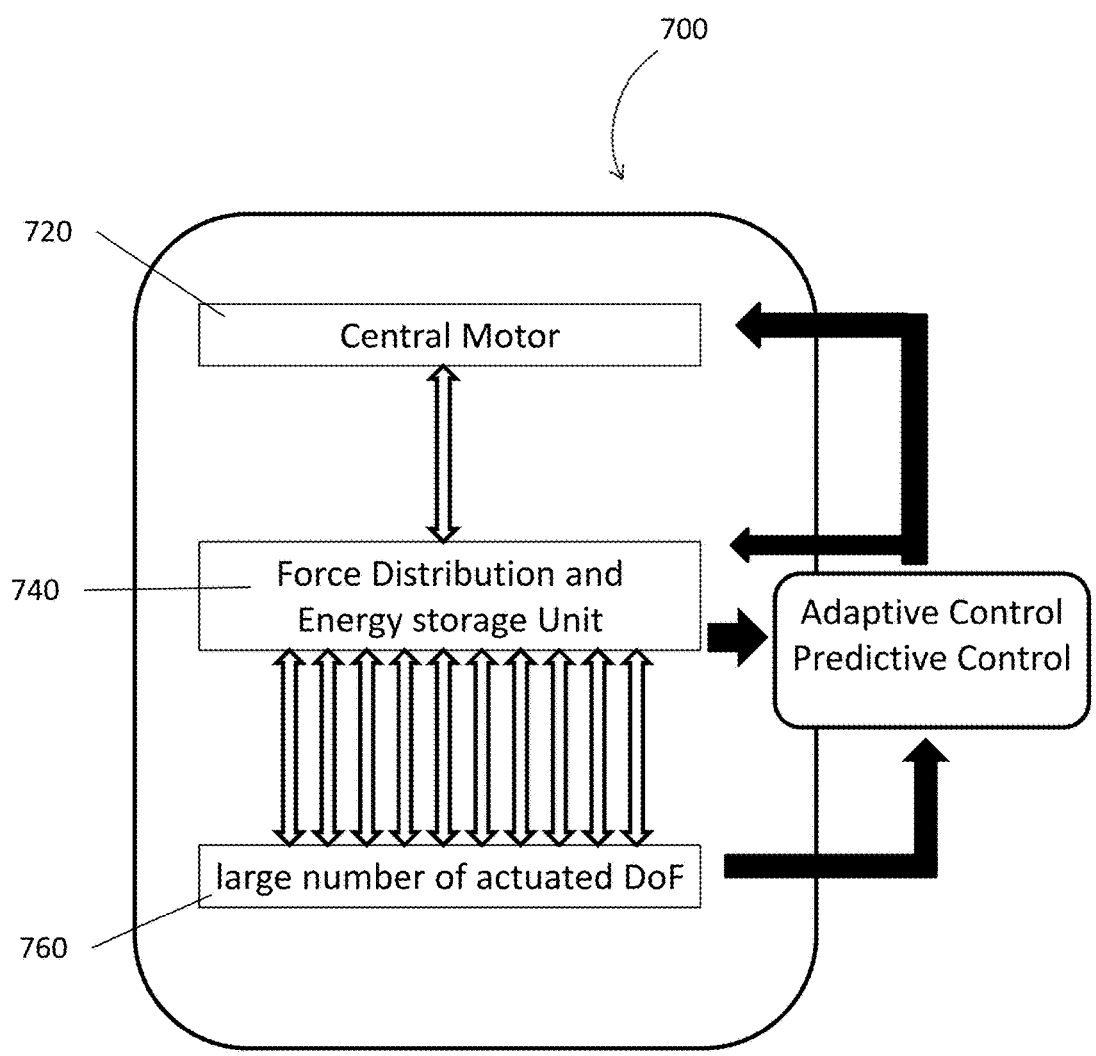
FIG. 7 illustrates a schematic diagram of an embodiment of OTM system, according to some embodiments.

FIG. 7 illustrates a schematic diagram of an embodiment of a OTM system 700, which can include various energy storage elements in the module 740. For example, a linear spring is a simple way to store energy in the form of elastic potential energy. The force output by linear springs is typically proportional to the displacement of the ends, although they can be designed to have different properties if desired.

According to embodiments of the OTM system, the module 740 can use torsion springs displaced radially, instead of storing energy in a radial displacement. This means that less space is needed to contain the charged spring. Torsion springs typically have a helical coil shape.

Similar to a torsion spring, the module 740 can use a power spring which is an elastic that holds energy when it is subject to a rotational displacement. It is a thin strip of spring steel that is wound into an arbor and contained in a housing and may be used with the OTM system 700.

Still referring to FIG. 7, another way to store energy via the module 740 is in a radial manner is through the use of a torsion bar which may also be used with the OTM system 700. Like a torsion spring, energy is imparted into the system when a rotation causes a body to deform. Typically a metal bar, the torsion bars generally require less rotation to achieve a given force than torsion springs. Torsion bars can be significantly heavier than springs, which make them particularly valuable in high-stress environments. They can be designed to have nonlinear force characteristics.

Still referring to FIG. 7, another way to store energy via the module 740 is using elastic tubing. Its flexibility makes it an accommodating to various designs, as it can be deformed multiple ways. It can be twisted, stretched along its axis, or wound around another body. It is inexpensive, but it typically won't hold as much energy as metallic springs.

Instead of storing energy in elastic potential energy in the module 740, it is also possible to store it as kinetic energy in the module 740 of the OTM system 700. The rotation of the input driveshaft could power the rotation of the flywheel, which would engage with the cable spool to release the energy when desired. This would require very good bearings to attempt to minimize losses of energy to friction, which would happen whenever the flywheel is spinning. In order to store lots of energy in a flywheel, it is necessary to have lots of mass. Also the inertia of the spinning flywheel can impart undesirable forces on the system. As noted above, the OTM systems of the present disclosure may utilize other types of energy.

Still referring to FIG. 7, as shown in block 760, various actuating elements may be used for connecting individual degrees of freedom to corresponding energy storage elements (modules 740) with the OTM system 700. In some embodiments, a cable, such as a Bowden cable, can be employed to transmit force from the energy storage device to the degree of freedom to actuate the degree of freedom. The cable can be flexible or ridged. Other suitable actuating members include, but are not limited to, secondary drive shafts, gears mechanisms, slider crank mechanisms, fluid based force, motion transfer mechanisms and similar devices.

Still referring to FIG. 7, the OTM system 700 may be managed by a microcontroller board based, for example, on an Atmega AVR chip. In some embodiments a control circuit may be designed to take the low level signals from the microcontroller and trigger the higher-current signals required to actuate the solenoids. Also simple switches may be added to control when the module needed to release the energy. Hence, the higher-level sequence may prove useful for the modules 740 to automatically charge after they had released the energy and received the signal to reset. The control architecture may be designed to allow for the addition of both more modules 740 as well as higher-level control for use with sensors.

In some embodiments, the OTM system 700 of FIG. 7 may include a variety of force sensor, position sensors or both. Based on state of specific degree of freedom and control goal the overall control system may define desired actuation force or torque for specific degree of freedom. Based on this desired force or torque a corresponding energy storage element releases the appropriate amount of energy to actuate specific degree of freedom. Desired amount of released energy depends on both required force or torque and given state of energy storage element of the module 740. In case of elastic element this process may be mechanically controlled by opening or closing multiple clutches (e.g. solenoids) and/or applying friction and/or damping forces via for example variable force breaks. The state of elastic element may be obtained via position sensors communicating linear on angular position of elastic element and/or directly by force measuring sensors.

Still referring to FIG. 7, in some embodiments, the main motor 720 may need to run only when one of modules 740 is triggered to charge. This in turn can prove more efficient than running the motor 720 at a constant velocity.

In some embodiments, the use of a servo to control position of a clutch, such as a band-brake, may prove useful. Because the mechanical design may incorporate an elastic element between the brake lever and the arm on the solenoid, the resistance allows for better control of the release.

According to some embodiments, it is noted that while the OTM systems described below may be in connection with rehabilitative or assistive devices, some of the embodiment of the OTM systems may be used in connection with nearly any system that requires single or multiple degrees of freedom that can benefit from low power, low weight, power amplification and reduced price (due to reduced number of required motors). Possible applications outside medical assistive devices include, but are not limited to, actuators and robotic systems for aerospace, space, underwater, ground transportation (power amplification in cars or motorcycles), sports, exercise, entertainment, 3D Internet with force feedback, or teleoperation.

Still referring to FIG. 7, in some embodiments, the OTM architecture comprises a modular structure 740 where each module adds one actuated degree of freedom to the OTM system 700 in which it is implemented. This allows for simple assembly of an OTM system based on the desired degrees of freedom and anticipated load dynamics.

Figure 8:
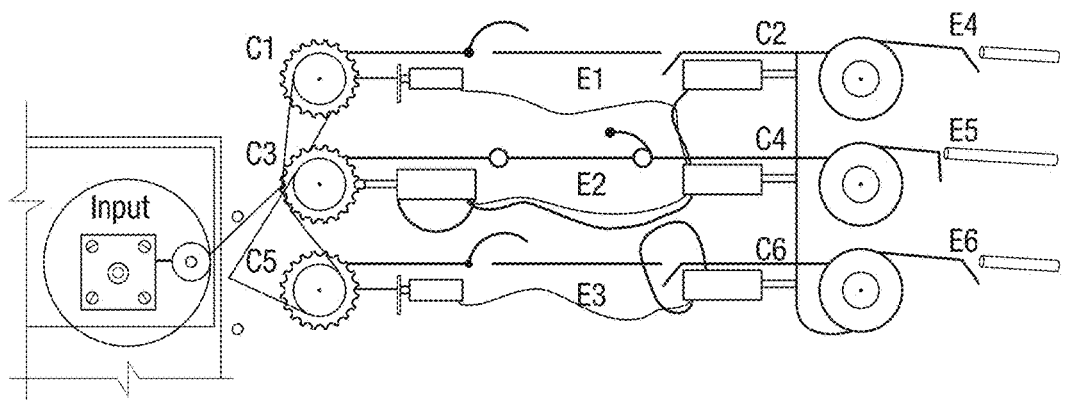
FIG. 8 illustrates an embodiment of a linear OTM system, according to some embodiments.

FIG. 8 illustrates an embodiment of a linear OTM system having a single motor connected to three independent motor units. Each module can consist of two gears which are axially constrained to two pulleys and connected to each other by elastic bands and two electromechanical solenoid clutches. Based on the current solenoid specifications, each module can be at least multiple times less expensive and several times lighter than an electric motor actuated system with the same power specifications.

Still referring to FIG. 8, according to some embodiments, the energy can be stored by disengaging the first of the two clutches, allowing the elastic element to be stretched by the motor, with the second clutch being used as the reference attachment point. The first clutch is then engaged, trapping the elastic potential energy, and storing it passively for as long as desired. When it is time for the energy to be distributed to a load, the second of the two clutches disengages, allowing the elastic element to return to equilibrium, now using the first clutch as its reference attachment point. This creates a pulling force in the cable, which can be complemented in a mechanical joint with a second motor unit for antagonistic muscle function.

The OTM concept allows for a build-up of energy over time that can be then released over a shorter period of time, thus providing for much larger power output to a load than the motor's generated power input. FIG. 8 depicts at least one embodiment of the overall architecture for OTM system. The essential elements can be the single electric motor, the force distribution and storage system or module, and the points of actuation.

Because each degree of freedom will be acted upon by an elastic element in a manner similar, but not identical to that of a Series Elastic Actuator, a biologically inspired actuation method can be achieved by putting several OTM motor units onto a single joint, allowing for variable mechanical impedance and different joint torques, assuming that each motor unit is placed at a slightly different joint attachment site.

Still referring to FIG. 8, this configuration allows three possible states: Charging (when the mechanical energy is transferred from the motor to an elastic element), Neutral (when energy is stored, passively constrained by the clutches, and unconnected to the motor and load), and finally, Release (when the potential energy of the elastic element is connected to the load and transferred to it). The hardware is fastened upon a piece of acrylic for demonstration purposes and easy of analysis.

Still referring to FIG. 8, as illustrated there are six clutch mechanisms (left, right), three elastic elements (center), and one motor drive-wheel (left). The springs demonstrate the actuated release (right) which represents a load placed upon the system. A motor unit consists of two clutch mechanisms and an elastic element. C1, C3, C5 are the energy storage clutches. C2, C4, C6 are the energy release clutches. Input is the motor drive wheel to charge springs. E1, E2, E3, are storage springs. E4, E5, E6 are experimental load springs.

Figure 9A:
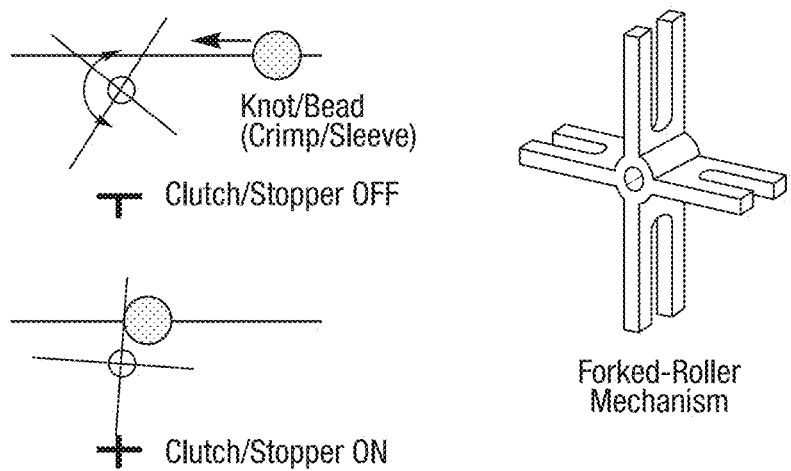
FIGS. 9A-9G illustrate embodiments of suitable clutches for use with a linear OTM system, according to some embodiments.
Figure 9B:
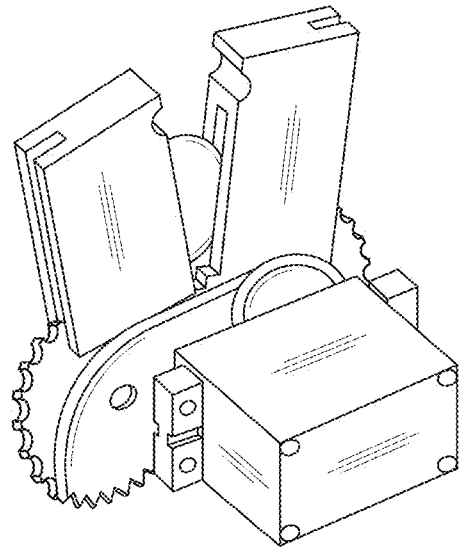
Figure 9C:
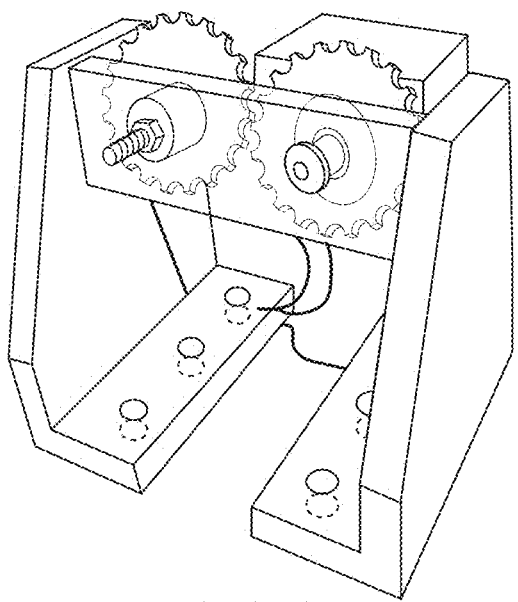
Figure 9D:
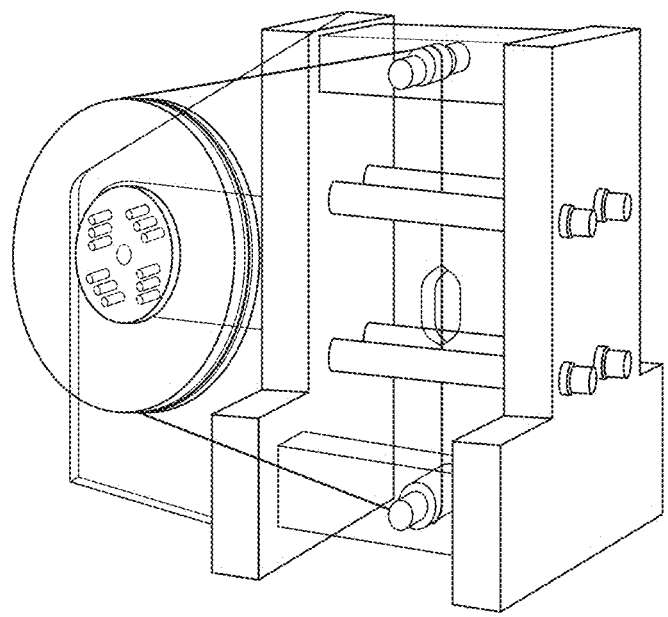
Figure 9E:
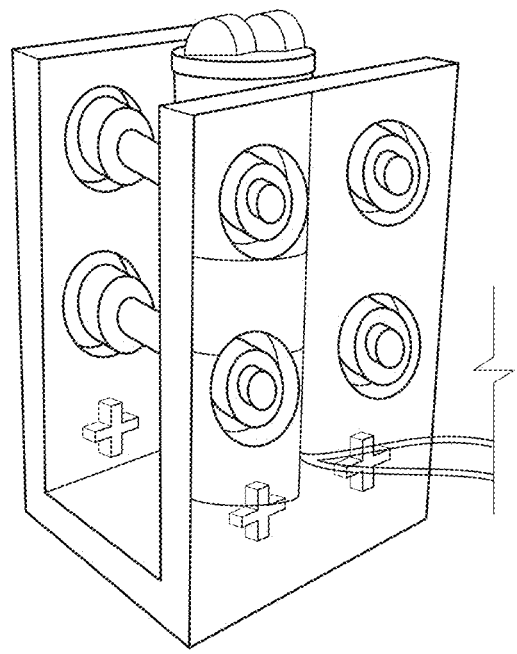
Figure 9F:
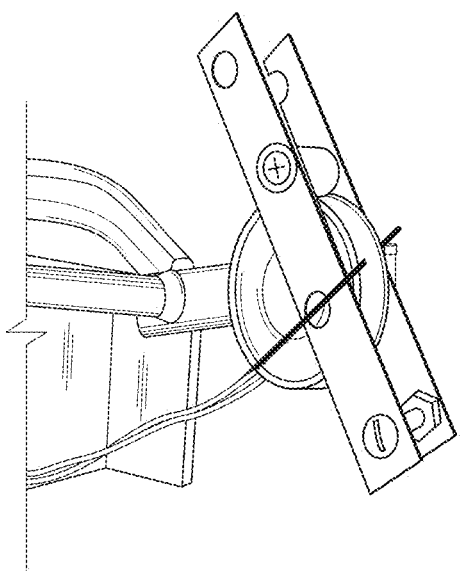
Figure 9G:
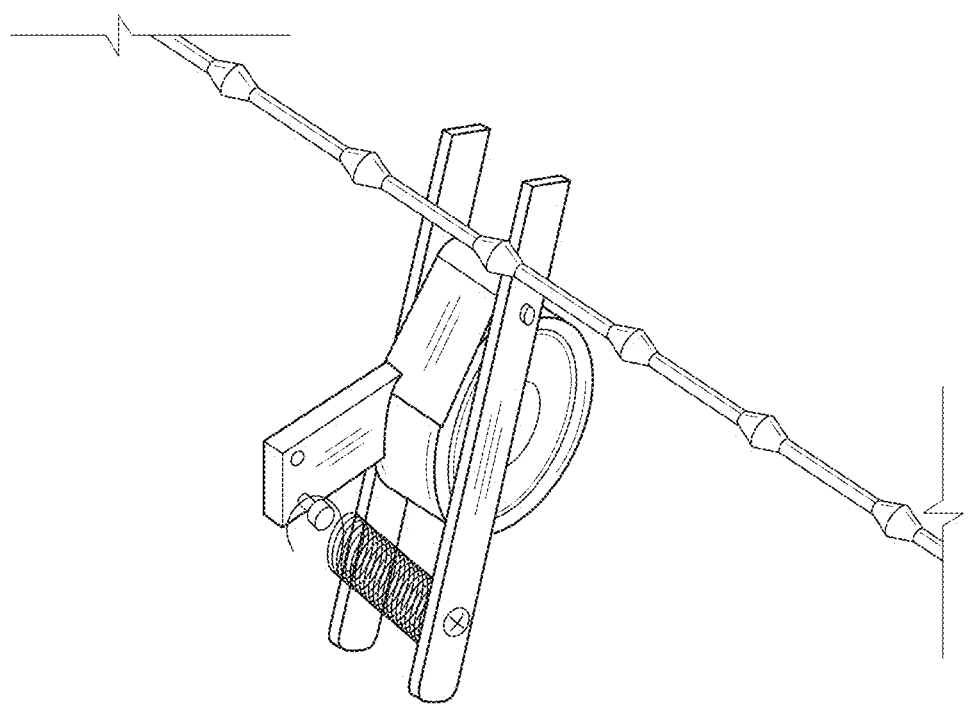

FIGS. 9A-G illustrate embodiments of suitable clutches for use with a linear OTM system. Acceptable clutches include, but are not limited to, bead and fork clutch (FIG. 9A), CAD and physical claw-gripper clutch (FIG. 9B and FIG. 9C), sliding slot clutch (FIG. 9D), and electromagnet clutches (FIG. 9E, FIG. 9F, and FIG. 9G).

Figure 10A:
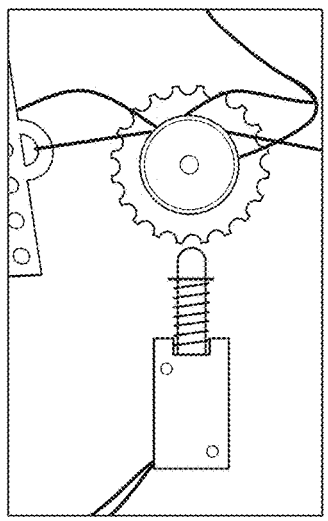
FIGS. 10A-C illustrate an embodiment of a linear OTM system with a latching clutch, according to some embodiments.
Figure 10B:
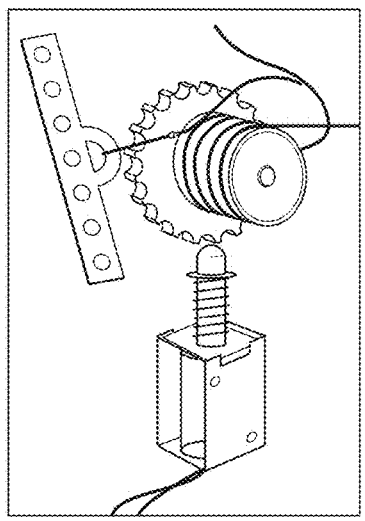
Figure 10C:
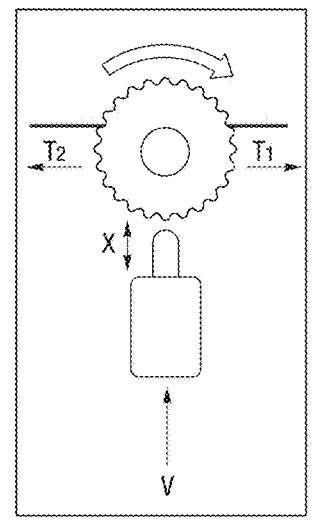

FIGS. 10A-C illustrate an embodiment of a linear OTM system with a latching clutch. The latching solenoid clutch stops the translation of the cable, with X being the solenoid's stroke length shown on the right, V is the speed at which the solenoid can engage the toothed pulley, and T1, T2 are the cable tensions from each side of the system.

Still referring to FIGS. 10A-C, the rotation of a toothed-pulley is fixed to the linear motion of the cable, so the pulley adds "stops" to every section of the cable. The distance between the "stops" is proportional to the distance between the pulley "teeth". These teeth can be finely spaced, making fine release control possible. Stopping the pulley's rotation is accomplished with a latching solenoid, a type of solenoid that employs a permanent magnet to hold it in a retracted state, and a spring to hold it in an extended state. These states can be toggled with a very short (e.g. 10 milliseconds) electrical pulse. Because of this solenoid feature, it can remain in its current state even after power has been removed, so power is therefore only needed to switch clutch states, not maintain them. This enables the system to encompass many desirable qualities without additional energy costs because mechanical energy can be stored without energy usage.

Figure 11:
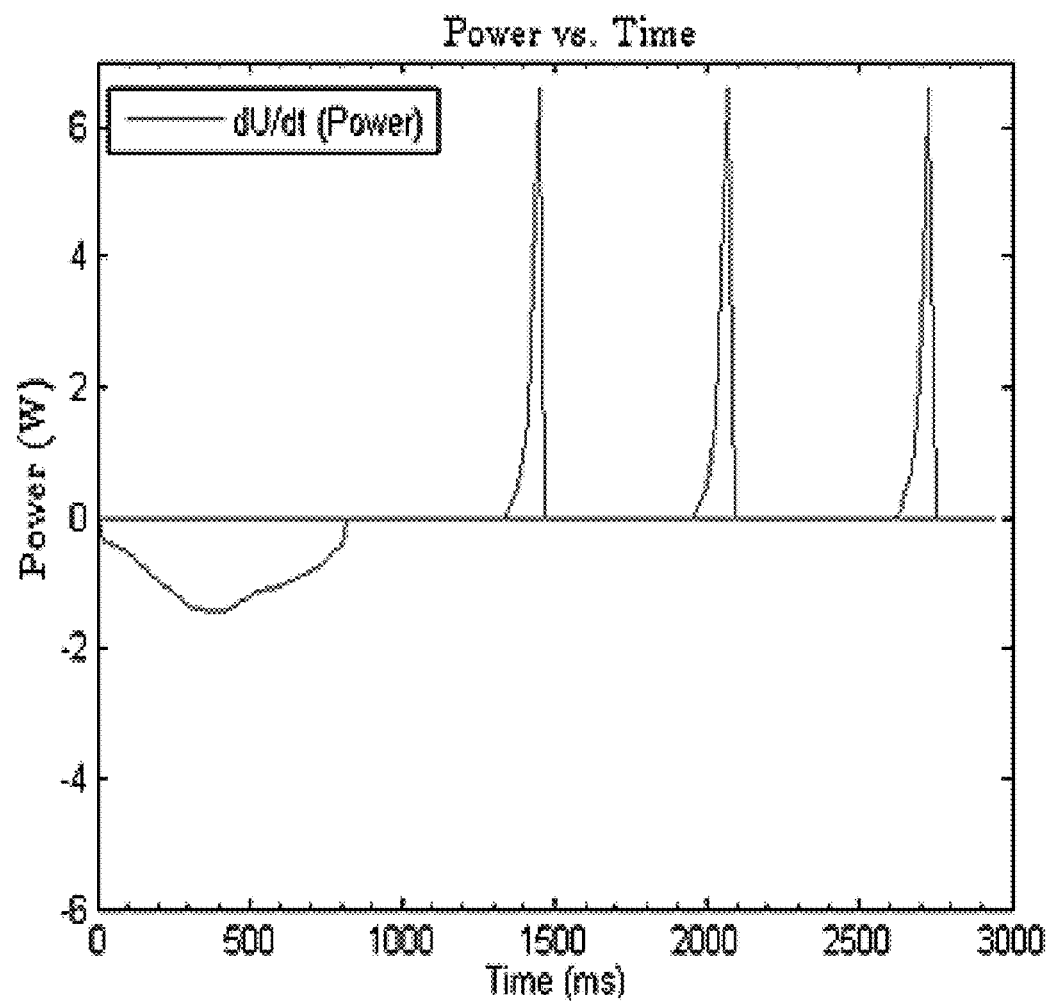
FIG. 11 illustrates a chart of the power input (negative function is power input) and power output (positive functions are power output) of a linear OTM system, according to aspect of some embodiments.

FIG. 11 illustrates a chart of the power input (negative function is power input) and power output (positive functions are power output) of a linear OTM system, according to some embodiments. The OTM system may be managed by a microcontroller board based, for example, on an Atmega AVR chip. The microcontroller is used in conjunction with an array of low-current solenoid drivers to relay the small logic-level signals from the microcontroller to the slightly higher current signals required by the solenoids. These drivers were capable of providing the bidirectional power output necessary to toggle a solenoid's state from extended to refracted or vice versa.

Still referring to FIG. 11, a short, 10 millisecond pulse generated by the microcontroller and amplified by the solenoid driver board is sufficient to invert the state of the solenoids.

The process of "charging" the elastic elements is then made possible by implementing a program (in this case within a C development environment) that outputs a binary sequence of timed on/off commands to each solenoid.

For all practical applications, solenoids control can be handled by a miniaturized low-level logic circuit.

Still referring to FIG. 11, control of the single electric motor that generates the energy to be stored in the elastic elements can be accomplished using a single Pulse-Width-Modulated (PWM) channel from the microcontroller to the Maxon motor driver board. The Maxon board is configured with a simple custom-made code script that allows it to vary the motor's velocity according to the signal which varies between 0 and 255.

The motor can be started and stopped as desired to optimize energy consumption. The control needs for OTM are minimal and can be handled by very simple circuits.

Still referring to FIG. 11, preliminary tests showed that elastic energy can be easily stored in springs and that the energy input versus output can be controlled over time to create customized power output characteristics. An experiment was performed where the OTM's single electric motor loaded elastic potential energy into the three energy storage springs. This energy was held for 500 milliseconds to demonstrate passive storage, and then released from each spring individually by the clutch mechanisms. To act as a load, three additional springs of the same type were secured to one end of the OTM and connected with cables to each actuated OTM DoF.

The initial state of the load springs was relaxed. As each DoF released energy into its respective load, the action was recorded using a camera recording 240 still images per second with a linear measuring tool placed across the whole system as a length reference. The video was analyzed frame-by-frame and the critical spring elongation vs. time data was recorded. From this data, each of the energy storage and load spring's elastic potential energy as a function of time was calculated. Finally, the data was plotted as a time derivative to show the OTM's instantaneous power output, as shown in FIG. 11.

Still referring to FIG. 11, from this plot, it can be seen that the electric motor can provide a smaller power output over a longer duration of time, and that the springs provided much higher power outputs over different time durations. This demonstrates how potential energy can be released over different durations to achieve higher or lower power output depending on the application's need. The sum of the areas of the three output functions was negligibly less than the area of the input function, showing that the OTM loses very little energy in the storage and release process.

This is the OTM's advantage over most systems with one electric motor per one degree of freedom, i.e. One-to-One (OTO) systems: energy efficiency. Although the utilization of energy efficient clutch mechanisms (which only require energy to change their binary state from locked to unlocked) reduces energy consumption, the greatest contributor to system efficiency is obtained by separating the electric motor from the load with a controlled length of elastic element; a setup is achieved where the motor never plays the role of the passive element.

This improves system efficiency greatly due to the: 1) actively controlled passive force support/actuation (the motor is always entirely disengaged from the load), 2) the ability to accommodate the electric motor's optimum operating conditions, and 3) its low-friction rotational mechanism architecture.

Still referring to FIG. 11, an OTM degree of freedom's equilibrium position can be adjusted, allowing for nearly any joint state to be maintained without energy input. Furthermore the motor can be completely disengaged from the system without affecting load-bearing properties; therefore the motor never needs to input torque to keep a DOF stationary. Additionally, the motor's efficiency can be optimized because the motor never directly engages with the load; instead, it is pumping energy into a discreet number of elastic elements. Because of this pre-known condition (i.e. one spring, two springs, etc.), no unexpected torques can be encountered, hence the motor may always rotate at a torque and velocity optimum to its electrical performance curves. Finally, the mechanical architecture of the OTM is primarily composed of springs and low friction ball-bearing pulleys.

The advantage to this is that springs store energy very efficiently, losing only marginal quantities of energy due to heat and friction. In addition, the bearing mounted pulleys have an extremely low coefficient of friction. Therefore it can be concluded that the lowest efficiency component of the OTM will be whichever electric motor is used to drive it. No significant loss of energy occurs during the storage and release cycle.

Figure 12A:
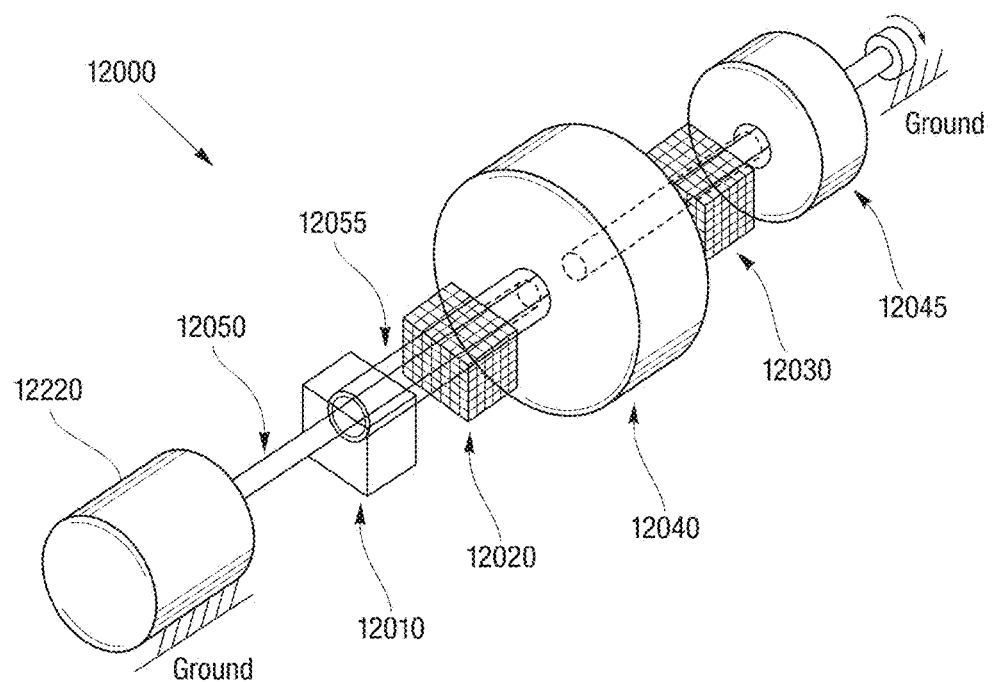
FIG. 12A illustrates an embodiment of a rotary OTM system, according to some embodiments.

FIG. 12A illustrates an assembled view of an embodiment of a rotary OTM system 1200, according to some embodiments. In general, the three clutches (12010, 12020 and 12030) within this OTM system 1200 work together to allow the system to charge, store and release energy when desired. The first clutch 12010 engages the main drive shaft 12050 and the secondary drive shaft 12055 when the system is charging. The rotation of the secondary drive shaft 12055 pulls on the elastic element 12040, which stores the energy as elastic potential energy. A passive clutch 12020 prevents the energy from releasing while a third clutch 12030 engages, which also maintains the energy storage. Now that the third clutch 12030 is engaged and locks the energy storage, the passive clutch 12020 can disengage. The third clutch 12030 can store the energy as long as necessary and then release it when desired. The disengagement of the third clutch 12030 allows the energy output to be controlled. This process of charging, storing and releasing energy is summarized in table 1 below.

TABLE 1

| Clutch 12010 State | Clutch 12020 State | Clutch 12030 State | OTM System 1200 status |
|---|---|---|---|
| Engaged | Passive | Engaged | Charging |
| Disengaged | Passive | Engaged | Storing Energy |
| Disengaged | Passive | Disengaged | Releasing Energy |
| Disengaged | Active | Disengaged | Resetting System |

Figure 13A:
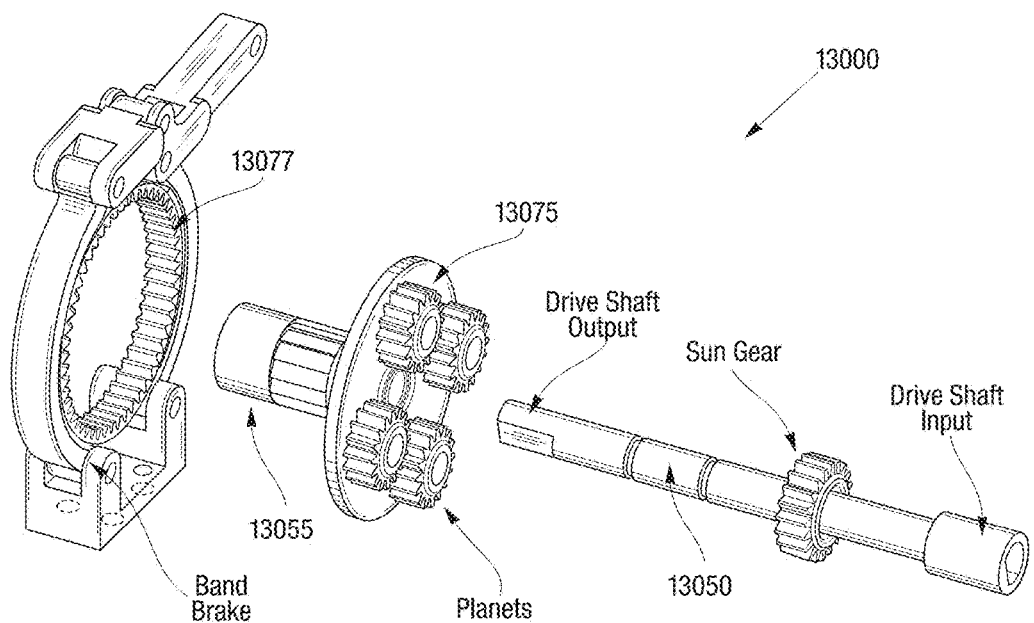
FIG. 13A illustrates an exploded view of a clutch, according to some embodiments.
Figure 13B:
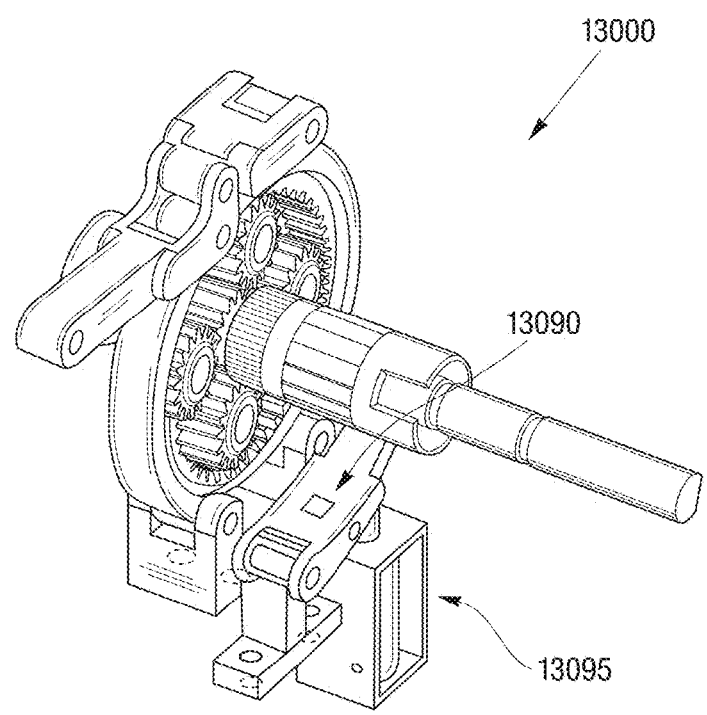
FIG. 13B illustrates the assembled clutch of FIG. 13A, according to some embodiments.
Figure 14:
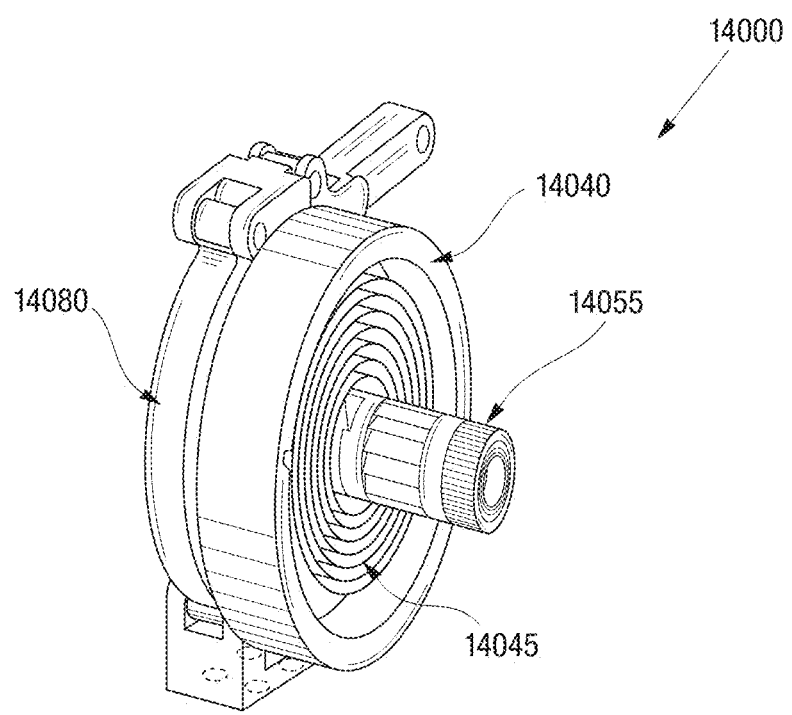
FIG. 14 illustrates a clutch suitable for use with a rotary OTM system, according to some embodiments.

The modules 12040 and 12045 operate by storing energy provided from the motor 12220 through the Main Drive Shaft (MDS) 12050, and storing it in a power spring contained in the Energy Storage Device (ESD) 12040 (see FIGS. 13-14).

First, the system starts in a neutral state where clutch 12030 is engaged, prepared to store energy, the main drive shaft 12050 is rotating, and clutch 12010 is disengaged allowing the ring gear freedom to rotate. When the module reaches a charge cycle clutch 12010 is engaged. With the ring gear fixed, the only degree of freedom left in the planetary gear set of clutch 12010 is the planets, and accordingly the carrier. As the carrier rotates, it powers the secondary drive shaft (SDS) 12055 which is directly interfaced with the power spring of the EDS 12040 (see also FIGS. 13-14).

After the system has been charged to the potential of the power spring clutch 12010 is disengaged and the ratchet pawl (clutch 12020) serves to store this energy such that the system as a whole can charge other modules (see also FIGS. 13-14).

When an output is required, whether sudden or gradual, clutch 12030 will be released by the actuation of a servo. As the servo is released, the amount of resistive torque generated by the band brakes falls to a point that the cable drum begins to rotate. As this drum rotates, Bowden cable is drawn into the system. In order to reset the Bowden cable to its zero-state the system is run through a three step process. Clutch 12010 is reengaged to take pressure off the ratchet pawl, the solenoid controlling the ratchet pawl is engaged to retract the pawl, and clutch 12010 is disengaged. This allows excess energy to be released through the ring gear. At this point the Bowden cable is free to be drawn out, clutch 12030 is reengaged, and the system is prepared for a charge cycle (see FIGS. 13-14).

Figure 12B:
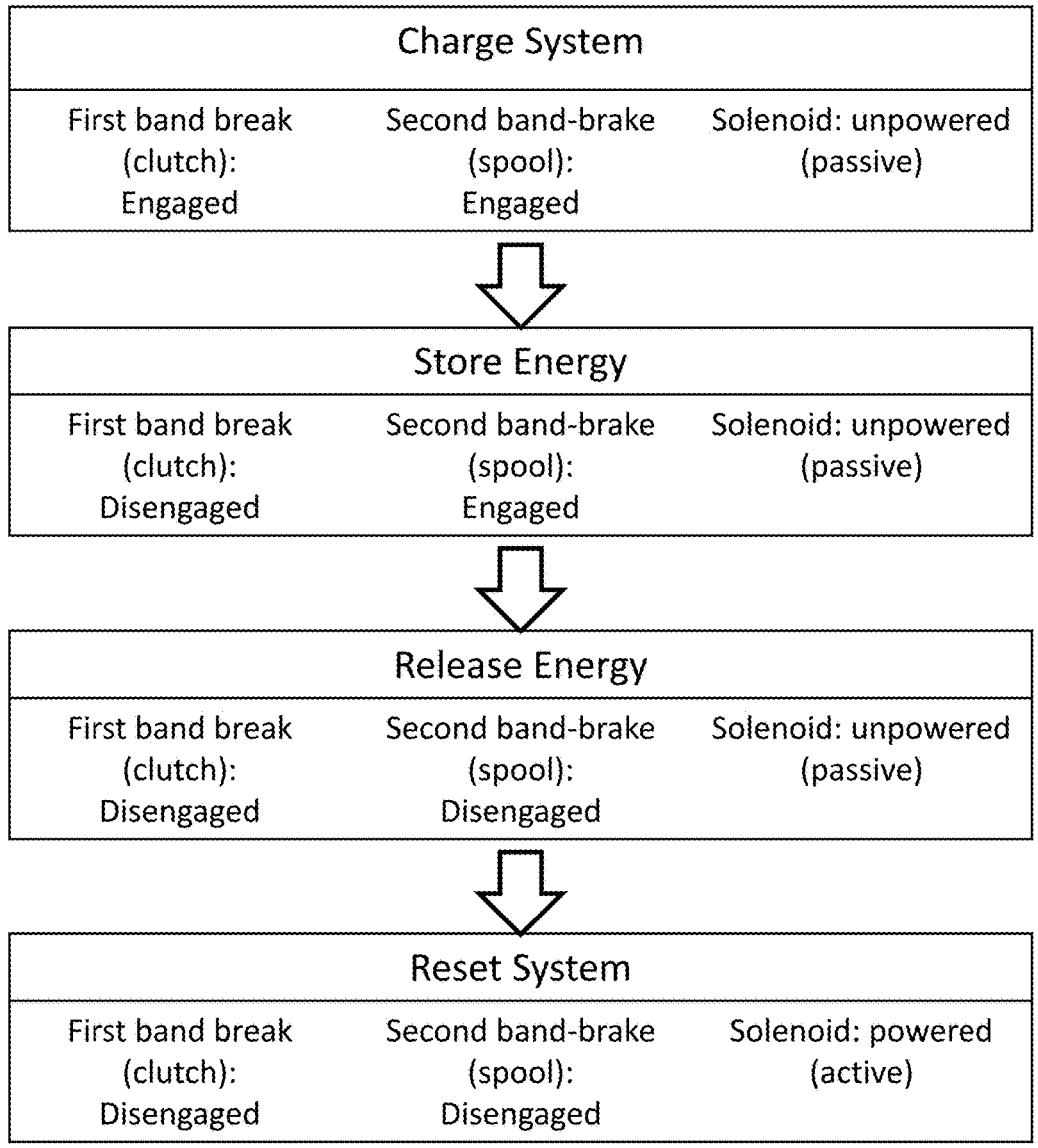
FIG. 12B illustrates a chart of the phases of a rotary OTM system, according to some embodiments.

FIG. 12B illustrates a chart of the phases of a rotary OTM system. As noted above, there are at least four phases of the system, among the embodiments, such that FIG. 12B illustrates at least one embodiment of the phases of a rotary OTM system.

FIG. 13A and FIG. 13B illustrate exploded views and an assembled, respectively, of an embodiment of a clutch 1300, according to some embodiments. FIG. 13A shows a planetary gear based clutch 1300 that allows for the drive shaft 13050 to rotate at a constant velocity, and simultaneously allow for at least one other output of the system at all times (based on grounding either of the two remaining elements). The secondary drive shaft 13055 (connected to the elastic element, not shown) was fixed to the carrier 13075 and the outer ring 13077 was pressed into an aluminum sleeve (not shown). The aluminum sleeve was then mounted in between two band brakes (only one band brake 13080 shown) operated by a servo. When the servo engages the band brakes, the outer ring 13077 becomes fixed and the secondary shaft 13055 begins to rotate. When the servo releases the band brakes, the passive resistance from the elastic element (not shown) is enough to fix the carrier 13075 in place, and as a result, the outer ring 13077 rotates freely. In some embodiments, disc brakes may be used instead of band brakes.

FIG. 13B shows additionally, a ratchet pawl 13090 added in contact with the secondary shaft 13055 to prevent back-drive while charging. A solenoid 13095 is connected to the ratchet 13090, and the force of the spring on the solenoid 13095 is enough to engage the ratchet 13090 passively. When the solenoid 13095 is powered, the ratchet pawl 13090 disengages from the secondary shaft 13055 allowing the system to completely reset.

The servos which control the band brakes are connected via an elastic linkage which allows the servo motors a small margin of error due to the high k-value to compensate for tuning issues. Because the release of energy from the system is controlled by friction, changing the position of the servo can change both the force output and release speed of the system. It should be noted that using servo controlled band brakes allows the user to control the rate of release of the energy from the energy storage element, and enable gradual release of the energy from the energy storage element. This controlled release is a major advantage of this system.

Figure 15A:
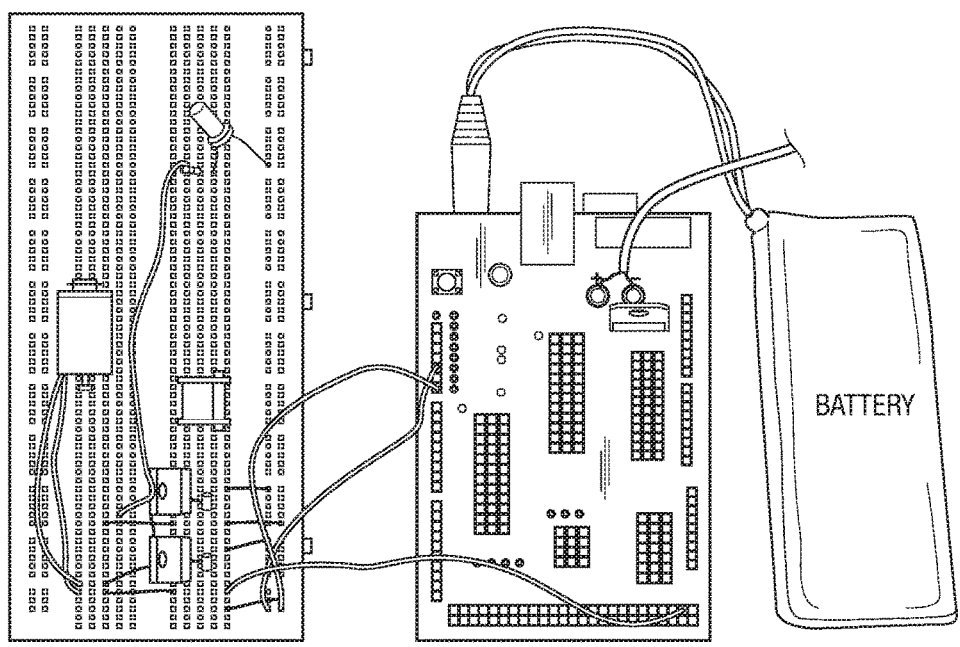
FIG. 15A illustrates a controller with a breadboard shield suitable for use with an OTM system, according to some embodiments.
Figure 15B:
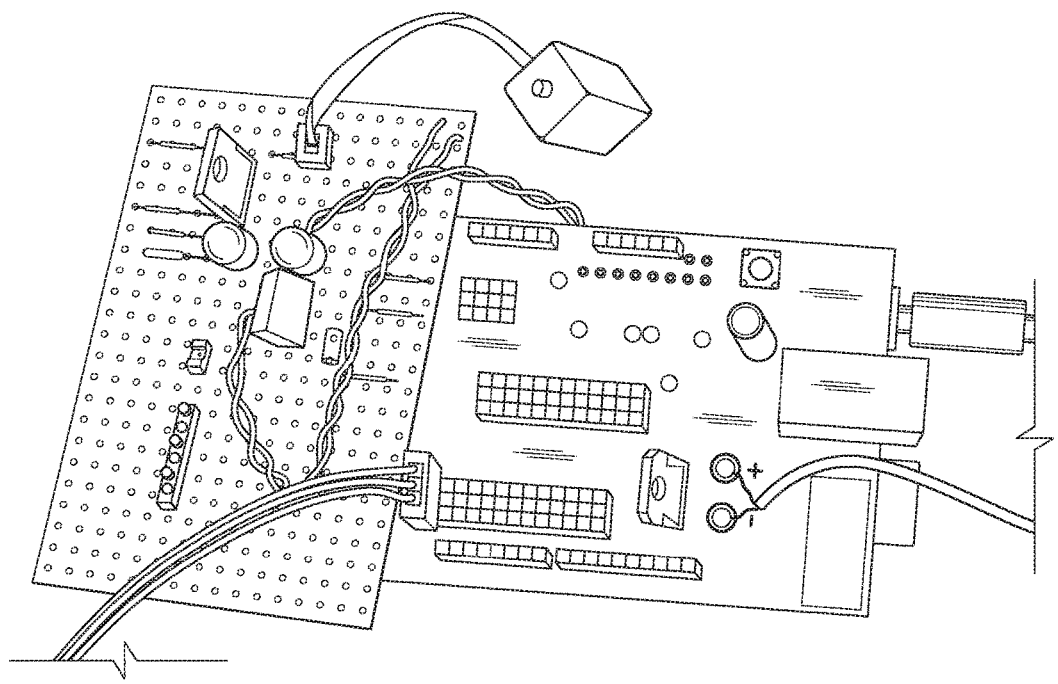
FIG. 15B illustrates a controller with a finalized shield suitable for use with an OTM system, according to some embodiments.
Figure 16A:
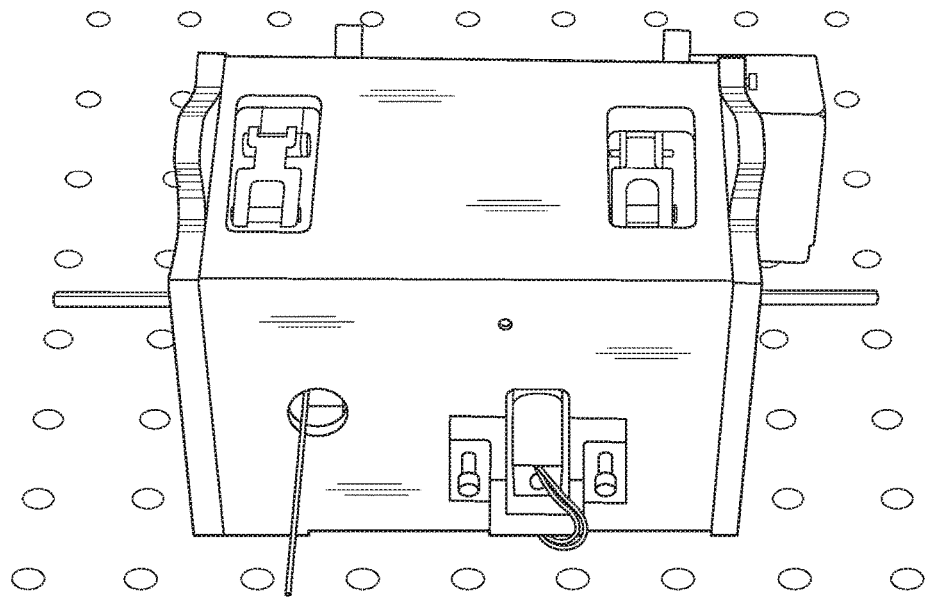
FIGS. 16A-16D illustrate photographs of embodiments of modules, according to some embodiments.
Figure 16B:
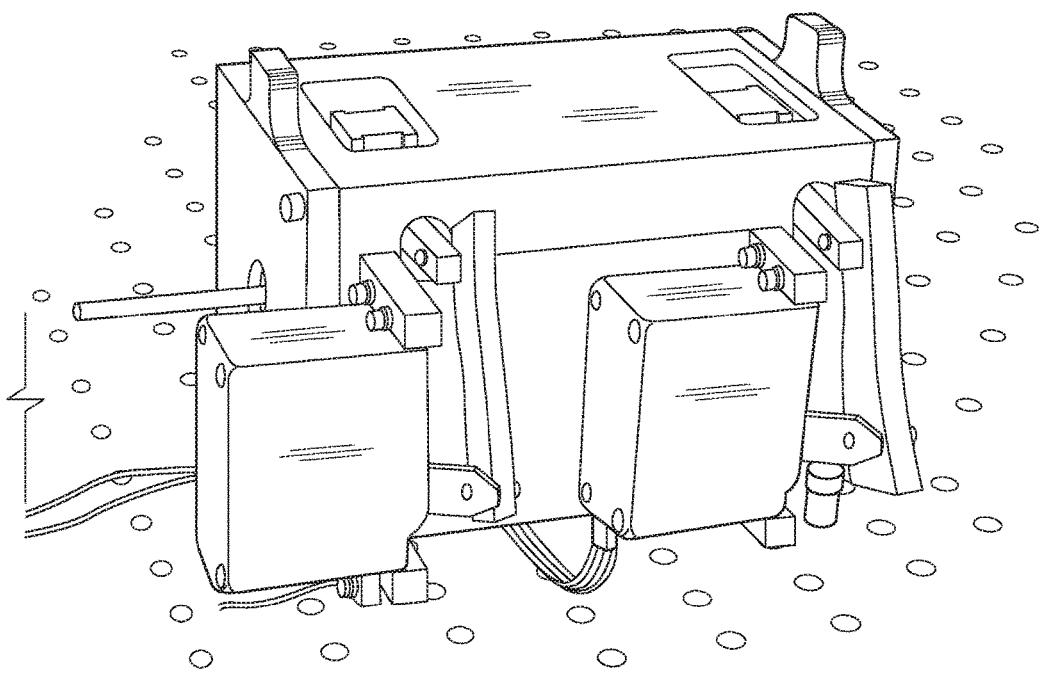
Figure 16C:
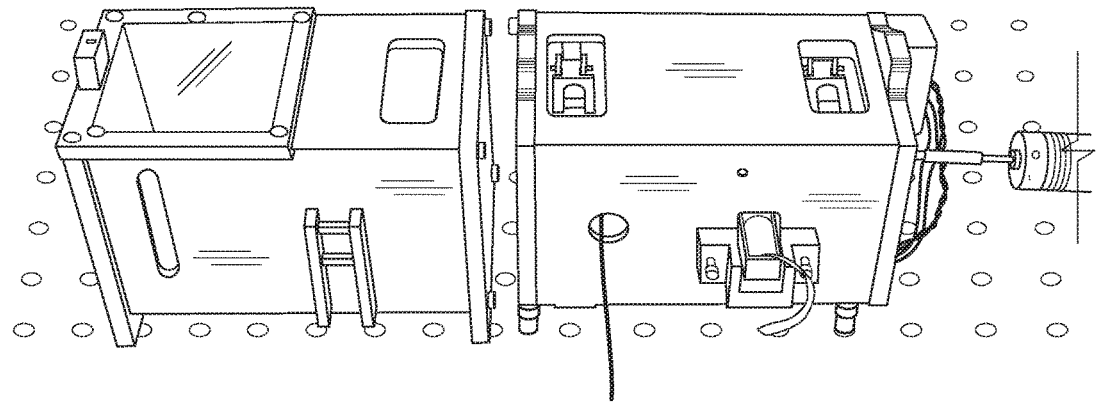
Figure 16D:
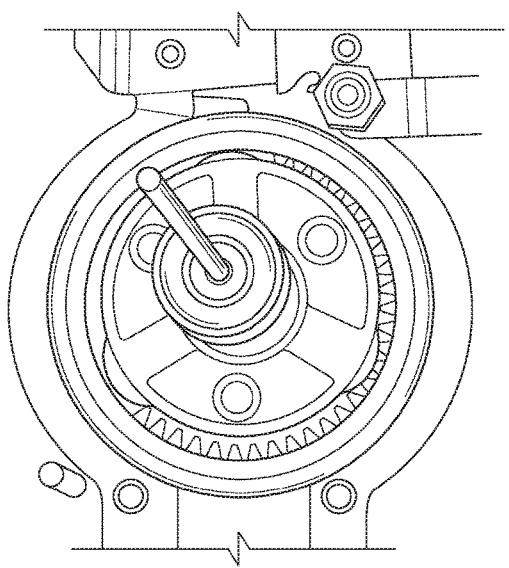

FIG. 14 illustrates a view of energy storage and a clutch suitable for use with a rotary OTM system, according to some embodiments. The energy storage element (or spool) 14040 is connected at one end to the secondary shaft 14055, and on the other, to a spool 14040 with a cable (not shown) fixed to it. A second servo operated band brake 14080 around the spool 14040 controls the release state of the system 1400. When charging, the band brake 14080 on the spool 14040 must be engaged to fix one end of the elastic element 14045. The other end of the elastic element 14045 is free to rotate and wind up while the secondary shaft 14055 is in motion. FIG. 15A and FIG. 15B illustrate a controller with a breadboard shield suitable for use with an OTM system. The OTM system can be controlled by a single-microcontroller designed around the Atmel AVR chip. The microcontroller is equipped with a customized shield which provides a good interface for connecting servo motors and non-latching solenoids. A circuit can be designed to take the low level signals from the microcontroller and trigger the higher-current signals required to actuate the solenoids. For testing purposes, switches were added to control when the module needed to release the energy. The higher-level sequence allowed for the modules to automatically charge after they had released the energy and received the signal to reset. The control architecture was designed to allow for the addition of both more modules as well as higher-level control for use with sensors.

Still referring to FIG. 15, additionally, the main motor only needs to run when a module is triggered to charge. This in turn can prove more efficient than running the motor at a constant velocity. In some embodiments, an estimated linear relationship between the position of the servo and the release speed has been worked into the program. This allows for the control position of the servo in series with the elastic element to control the friction of the band-brake on the spool. Controlling this friction is desirable to better control of the OTM release onto the attached load.

FIGS. 16A-D present photographs of some non-limiting examples of modules. In some embodiments, the band brakes may be linked with a small steel link that could be contained within the end of each brake, accordingly reducing size, weight, and manufacturing costs. In some embodiments, the cable may be placed at a tangent to the spool when it begins to wrap, as such producing a much more linear and consistent force curve. In some embodiments, the ratchet pawl can be used to prevent back-drive of the secondary drive shaft and accordingly maintain energy in the system; this friction was significantly increased due to a high tangential force. The solution implemented to prevent this excess friction can both support the secondary drive shaft on bearings about the main drive shaft and control the position of the secondary drive shaft by using a large bearing fixed to the case. With the addition of these bearings, the friction between the shafts can be significantly reduced and deflection of the main drive shaft can be minimized.

Figure 17A:
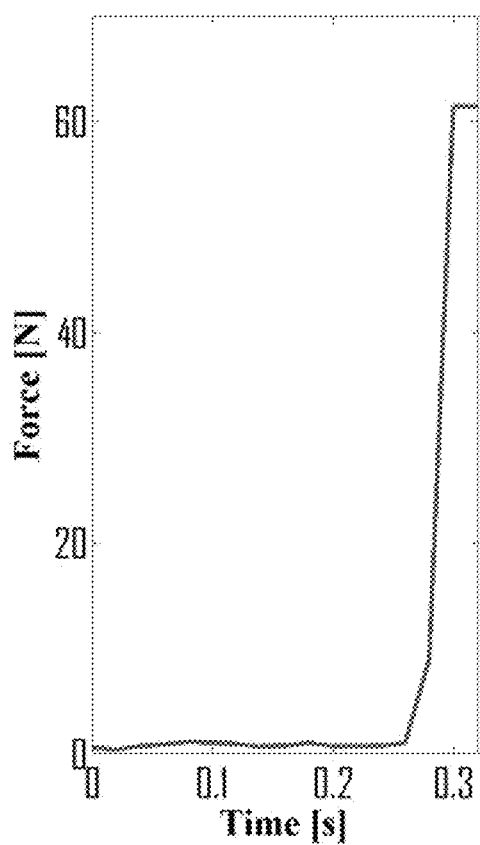
FIG. 17A illustrates a chart that plots force versus time for a time trial of a rotary OTM system, according to some embodiments.
Figure 17B:
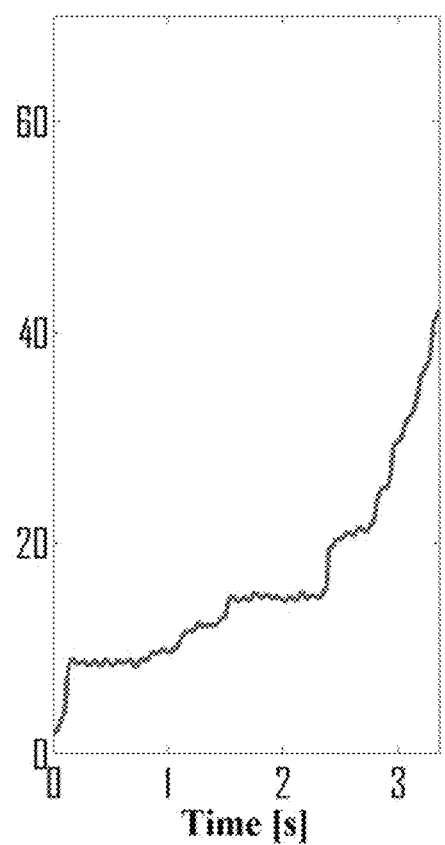
FIG. 17B illustrates a chart that plots force versus time for another time trial of a rotary OTM system, according to some embodiments.

FIGS. 17A-B illustrate charts that plot force versus time for several time trials of a rotary OTM system. In particular, a series of tests were conducted on the modules that determined the suitability of a system of modules in the anticipated market application. The tests measured the force and power output of a single module, the time to charge a single module, the time to charge two modules in series, and the duration of continuous use from a single battery charge. To test the force output, the system with one module was grounded and then connected to a mass, which was held by the Bowden cable as it hung over the side of the table. The Bowden cable was placed upon a Vernier Rotary Motion Sensor, which was able to measure the position, velocity and acceleration of the mass. The system was charged and then allowed to actuate and lift the hanging mass. The data from the test could be used to infer information about the force acting on the mass at any given time as well as levels of energy that were stored in the system when it was triggered.

Still referring to FIGS. 17A-B, the first time the position of the mass was measured; the secondary band brake was released completely, which allowed the elastic element to release all of its stored energy at once. This resulted in a sharp spike in the output force, showing the device's capability for a large maximum force when required. As seen in FIG. 17A, the force output reached 60N before flatlining, indicating that the available instrumentation could not accurately measure the force. As this full force of the spring is not always needed or even desired, it is desirable to control the release of the cable actuation. A test was run with the second band brake being released slowly, which gradually decreases the friction between the brake and the drum and allows the output to be released slowly.

FIG. 17B depicts the results of the test which demonstrated this controlled output. The cable begins to pull at under 10N, but it rises to above 40N by the end. The force of the spring quickly overcomes the static friction, and begins to release the rest of its energy at a constant force, as can be seen by the periods of small variations in applied force in the graph. These can be attributed to the servos that control the band brakes reaching a given position before moving to the next, less engaged step. In an application that requires a precise force release, the position of the servo can be used to control the output.

Figure 18:
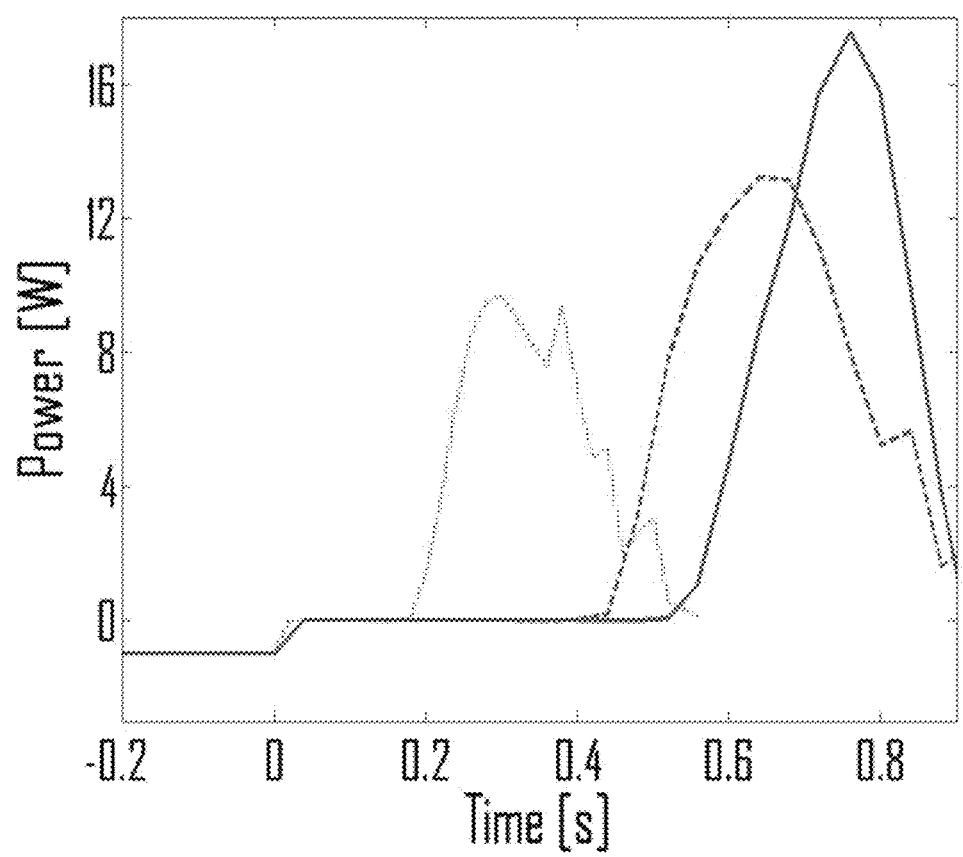
FIG. 18 illustrates a chart that plots power versus time for three time trials of a rotary OTM system, according to some embodiments.

FIG. 18 illustrates a chart that plots power versus time for three time trials of a rotary OTM system. In particular, in addition to the force output by individual modules, it was necessary to examine the power release in the previous tests. The same data was able to give insight about how the system stored and released energy. Each test began with a charging cycle, which puts a low level of power into the elastic element at a slow, constant rate. The energy from this charging cycle gets released at a different rate when the elastic element is triggered, and power is augmented. As shown in FIG. 18, a constant amount of energy is released over variable lengths of time, which correspond to a variable level of power augmentation.

Embodiments of some of the OTM systems can be used to transmit relatively small forces in many degrees of freedom in a lightweight system. At least one potential commercial application for these systems is in rehabilitative and assistive devices. There are many common medical conditions that can claim partial or full mobility of a person's body. These conditions include stroke, cerebral palsy, and spinal cord injury. When this happens, signals from the brain fail to trigger the appropriate response from a person's muscles. A robotic assistive device can gather those signals and trigger a response from an artificial muscle instead, allowing victims of such conditions to regain the use of their limbs. In some embodiments, because each degree of freedom will be acted upon by an energy storage element, a biologically inspired actuation method can be achieved by putting several OTM motor units onto a single joint, allowing for variable mechanical impedance and different joint torques, assuming that each motor unit is placed at a slightly different joint attachment site.

In addition, some of the embodiments of OTM systems may be used in connection with nearly any system that requires single or multiple degrees of freedom that can benefit from low power, low weight, power amplification and reduced price (due to reduced number of required motors). Possible applications outside medical assistive devices include, but are not limited to, actuators and robotic systems for aerospace, space, underwater, ground transportation (power amplification in cars or motorcycles), sports, exercise, entertainment, 3D Internet with force feedback, or teleoperation.

In some embodiments, an actuation system includes a motor having a drive shaft; an energy storage element operatively connected to a degree of freedom to actuate the degree of freedom; and a plurality of clutches configured to couple the energy storage element to the drive shaft of the motor and to control an energy state of the energy storage element, wherein the degree of freedom is actuated in response to a discharge of energy from the energy storage element. In some embodiments, the actuation system may further include an actuating member connected at one end to the energy storage element and at the other end to the degree of freedom to connect the energy storage element to the degree of freedom. In some embodiments, the actuating member is isolated from the drive shaft. In some embodiments, the energy storage element is a rotary spring and the system may include a first clutch for coupling the energy storage element to the drive shaft to charge the energy storage element; a second clutch for resetting the energy storage element; and a third clutch for controlling discharge of energy from the energy storage element to actuate the degree of freedom. In some embodiments, the energy storage element is a linear spring, and the system may include a first clutch for coupling the energy storage element to the drive shaft to charge the energy storage device; and a second clutch for controlling discharge of energy from the energy storage element to actuate the degree of freedom.

In some embodiments, an actuation system includes a motor having a drive shaft; an energy storage element; a plurality of clutches configured to couple the energy storage element to the drive shaft of the motor and to control an energy state of the energy storage element; and an actuating member connected to the energy storage element, wherein the actuating member actuates a degree of freedom in response to a discharge of energy from the energy storage element.

In some embodiments, an actuation system includes a motor having a drive shaft; a plurality of energy storage elements coupled to the drive shaft, wherein an energy state of each storage element is controlled by a plurality of clutches independently of other energy storage elements; and a plurality of actuating members connected to the plurality of the energy storage elements, wherein the actuating member actuates a degree of freedom in response to a discharge of energy from a corresponding energy storage element.

In some embodiments, an actuation system includes a motor having a drive shaft; a plurality of modules coupled to the drive shaft, each module comprising an energy storage element and an actuating member connected to the energy storage element at one end and to a degree of freedom at another end to actuate the degree of freedom in response to a discharge of energy from the energy storage element; and a plurality of clutches associated with each module to couple the energy storage element of the module to the drive shaft of the motor and to control an energy state of the energy storage element independent of energy storage elements of other modules.

In some embodiments of the present disclosure, there can be provided an actuation system that includes a motor having a drive shaft; an energy storage element operatively connected to a degree of freedom to actuate the degree of freedom; and a plurality of clutches configured to couple the energy storage element to the drive shaft of the motor and to control an energy state of the energy storage element, wherein the degree of freedom is actuated in response to a discharge of energy from the energy storage element.

According to some aspects of the present disclosure, the actuation system may further include an actuating member connected at one end to the energy storage element and at the other end to the degree of freedom to connect the energy storage element to the degree of freedom. Further, the actuating member can be isolated from the drive shaft. Further still, the energy storage element can be a rotary spring and the system may include a first clutch for coupling the energy storage element to the drive shaft to charge the energy storage element; a second clutch for resetting the energy storage element; and a third clutch for controlling discharge of energy from the energy storage element to actuate the degree of freedom. It is possible that the energy storage element can be a linear spring. It is contemplated that the system may include a first clutch for coupling the energy storage element to the drive shaft to charge the energy storage device; and a second clutch for controlling discharge of energy from the energy storage element to actuate the degree of freedom.

In some embodiments of the present disclosure, there can be provided an actuation system that includes a motor having a drive shaft; a plurality of modules coupled to the drive shaft, each module comprising an energy storage element and an actuating member connected to the energy storage element at one end and to a degree of freedom at another end to actuate the degree of freedom in response to a discharge of energy from the energy storage element; and a plurality of clutches associated with each module to couple the energy storage element of the module to the drive shaft of the motor and to control an energy state of the energy storage element independent of energy storage elements of other modules.

In some embodiments of the present disclosure, there can be an actuation system comprising a motor having to at least one drive shaft, and two or more energy storage elements operatively connected to one or more degree of freedom to actuate the degree of freedom. Further, a plurality of clutches configured to couple the two or more energy storage elements to the at least one drive shaft of the motor and to control an energy state of the two or more energy storage elements. Wherein, the one or more degree of freedom for each energy storage element is actuated in response to a discharge of energy from each energy storage element. Further still, an amount of total stored energy over a period of time for the two or more energy storage elements has a discharge rate or a total power output that is greater than a maximum generated power input of the motor for the same period of time.

According to aspects of the actuation system, the plurality of clutches can comprise of a first clutch for coupling a first energy storage element of the two or more energy storage elements to a first drive shaft of the at least one drive shaft to charge the first energy storage element. Further, a second clutch for resetting the first energy storage element, and a third clutch for controlling discharge of energy from the first energy storage element to actuate the degree of freedom.

According to aspects of the actuation system, the first energy storage element can be one of a linear spring or a rotary spring. Further, the plurality of clutches can comprise of a first clutch for coupling the first energy storage element to the first drive shaft to charge the first energy storage device. Further still, there can be a second clutch for controlling discharge of energy from the first energy storage element to actuate the degree of freedom.

According to aspects of the actuation system, it is possible each energy storage element of the two or more energy storage elements can be operatively connected to one degree of freedom in a one to correspondence to actuate the degree of freedom. Further, the multiple energy storage elements of the two or more energy storage elements can be operatively connected to one degree of freedom to actuate the degree of freedom.

According to some embodiments, an actuation system comprising a motor having at least one drive shaft. Further, two or more energy storage elements can be operatively connected to one or more degree of freedom to actuate the one or more degree of freedom. Wherein, multiple energy storage elements of the two or more energy storage elements can be operatively connected to one degree of freedom of the one or more degree of freedom to actuate the degree of freedom. Further still, a plurality of clutches can be configured to couple the multiple energy storage elements to the at least one drive shaft of the motor and to control an energy state of the multiple storage elements. Wherein, the degree of freedom for each energy storage element of the multiple energy storage elements can be actuated in response to a discharge of energy from each energy storage element of the multiple energy storage elements.

According to some embodiments, a method of actuation includes providing a motor with at least one drive shaft. Operatively connecting two or more energy storage elements to one or more degree of freedom to actuate the one or more degree of freedom and configuring a plurality of clutches to couple the two or more energy storage elements to the at least one drive shaft of the motor and to control an energy state of the two or more energy storage elements. Wherein the one or more degree of freedom for each energy storage element that can be actuated in response to a discharge of energy from each energy storage element. Configuring a first clutch of the plurality of clutches for coupling a first energy storage element of the two or more energy storage elements to a first drive shaft of the at least one drive shaft to charge the first energy storage element. Configuring a second clutch of the plurality of clutches for resetting the first energy storage element, and configuring a third clutch of the plurality of clutches for controlling discharge of energy from the first energy storage element to actuate the one or more degree of freedom.

In some embodiments, an actuation system comprises a motor having a drive shaft; one or more modules coupled to the drive shaft, each module comprising one or more energy storage elements and one or more actuating members connecting the one or more energy storage elements to one or more degrees of freedom, which are configured to actuate in response to a discharge of energy from the one or more energy storage element; and a plurality of clutches associated with each module to couple the energy storage element of the module to the drive shaft of the motor and to control an energy state of the energy storage element independent of energy storage elements of other modules.

In some embodiments, an actuation system comprises a motor having to at least one drive shaft; two or more energy storage elements operatively connected to one or more degree of freedom to actuate the one or more degree of freedom; and a plurality of clutches configured to couple the two or more energy storage elements to the at least one drive shaft of the motor and to control an energy state of the two or more energy storage elements, wherein the one or more degree of freedom for each energy storage element is actuated in response to a discharge of energy from each energy storage element. In some embodiments, an amount of total stored energy over a period of time for the two or more energy storage elements has a discharge rate or a total power output that is greater than a maximum generated power input of the motor for the same period of time.

In some embodiments, a method of actuation of one or more of degrees of freedom includes providing a motor with at least one drive shaft; operatively connecting one or more energy storage elements to one or more degree of freedom; enabling the motor to transfer energy to the one or more energy storage elements; storing the transferred energy by the one or more energy storage elements; and allowing the one or more energy elements to release the stored energy to actuate the one or more degree of freedom. In some embodiments, the method may further include the steps of configuring a plurality of clutches to couple the one or more energy storage elements to the at least one drive shaft of the motor and to control an energy state of the one or more energy storage elements, and operating the plurality of clutches to perform one or more of the transferring, storing, and allowing steps.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. An actuation system comprising:
   a motor having a drive shaft;
   one or more modules coupled to the drive shaft, each module of the one or more modules comprising one or more energy storage elements and one or more actuating members connecting the one or more energy storage elements to one or more degrees of freedom, the one or more degrees of freedom being configured to actuate in response to a discharge of energy from the one or more energy storage elements; and
   a plurality of clutches associated with each module of the one or more modules to couple the one or more energy storage elements of the module to the drive shaft of the motor and to control an energy state of the energy storage element independent of energy storage elements of other modules of the one or more modules,
   wherein the plurality of clutches comprises: a first clutch for coupling the energy storage element to the drive shaft to charge the energy storage element; and a second clutch for resetting the energy storage element.

2. The actuation system of claim 1 wherein each module comprises multiple energy storage elements.

3. The actuation system of claim 1, wherein the one or more actuating members are isolated from the drive shaft.

4. The actuation system of claim 1, wherein the plurality of clutches further comprises a third clutch for controlling discharge of energy from the energy storage element to actuate the one or more degrees of freedom.

5. The actuation system of claim 1, wherein the energy storage element is a linear spring.

6. The actuation system of claim 1, wherein the energy storage element is a rotary spring.

7. The actuation system of claim 1, wherein each energy storage element of the one or more energy storage elements is operatively connected to one degree of freedom of the one or more degrees of freedom in a one to one correspondence to actuate the degree of freedom.

8. The actuation system of claim 1, wherein multiple energy storage elements of the one or more energy storage elements are operatively connected to one degree of freedom of the one or more degrees of freedom to actuate the degree of freedom.

9. An actuation system comprising:
   a motor having to at least one drive shaft;
   two or more energy storage elements operatively connected to one or more degree of freedom to actuate the one or more degrees of freedom; and
   a plurality of clutches configured to couple the two or more energy storage elements to the at least one drive shaft of the motor and to control an energy state of the two or more energy storage elements,
   wherein the one or more degrees of freedom for each energy storage element is actuated in response to a discharge of energy from each energy storage element.

10. The actuation system of claim 9 wherein an amount of total stored energy over a period of time for the two or more energy storage elements has a discharge rate or a total power output that is greater than a maximum generated power input of the motor for the same period of time.

11. The actuation system of claim 9, wherein the plurality of clutches comprises:
    a first clutch for coupling a first energy storage element of the two or more energy storage elements to a first drive shaft of the at least one drive shaft to charge the first energy storage element; and
    a second clutch for resetting the first energy storage element.

12. The actuation system of claim 11, wherein the plurality of clutches further comprises a third clutch for controlling discharge of energy from the first energy storage element to actuate the one or more degrees of freedom.

13. The actuation system of claim 10, wherein the two or more energy storage elements comprise a linear spring or a rotary spring.

14. The actuation system of claim 10, wherein each energy storage element of the two or more energy storage elements is operatively connected to one degree of freedom of the one or more degree of freedom in a one to correspondence to actuate the degree of freedom.

15. The actuation system of claim 10, wherein multiple energy storage elements of the two or more energy storage elements are operatively connected to one degree of freedom of the one or more degrees of freedom to actuate the degree of freedom.

16. A method of actuation comprising:
    providing a motor with at least one drive shaft;
    configuring a plurality of clutches to couple the one or more energy storage elements to the at least one drive shaft of the motor and to control an energy state of the one or more energy storage elements;
    operatively connecting one or more energy storage elements to one or more degrees of freedom;
    enabling the motor to transfer energy to the one or more energy storage elements;
    storing the transferred energy by the one or more energy storage elements; and
    allowing the one or more energy elements to release the stored energy to actuate the one or more degrees of freedom.

17. The method of claim 16 further comprising operating the plurality of clutches to perform one or more of the transferring, storing, and allowing steps.

* * * * *